US010171636B2

(12) United States Patent
Yeo et al.

(10) Patent No.: US 10,171,636 B2
(45) Date of Patent: Jan. 1, 2019

(54) ELECTRONIC DEVICE INCLUDING DISPLAY

(71) Applicant: Samsung Electronics Co., Ltd., Gyeonggi-do (KR)

(72) Inventors: Jung Hee Yeo, Seoul (KR); Kuk Hwan Kim, Seoul (KR); Dong Kyun Kim, Seoul (KR); Jae Ho Baik, Gyeonggi-do (KR); Sung Jin Yum, Seoul (KR); Ji Young Lee, Seoul (KR); Jin Sang Hwang, Seoul (KR); Woon Geun Kwak, Gyeonggi-do (KR); Jung Sik Park, Gyeonggi-do (KR); Byoung Uk Yoon, Gyeonggi-do (KR); Yong Seok Lee, Seoul (KR); Jung Won Lee, Gyeonggi-do (KR); Min Su Jung, Seoul (KR); Seung Min Choi, Gyeonggi-do (KR); Hyun Ju Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/477,722

(22) Filed: Apr. 3, 2017

(65) Prior Publication Data

US 2017/0289324 A1 Oct. 5, 2017

(30) Foreign Application Priority Data

Apr. 1, 2016 (KR) ........................ 10-2016-0040398

(51) Int. Cl.

*G06F 1/16* (2006.01)
*H04M 1/02* (2006.01)
*G03B 29/00* (2006.01)

(52) U.S. Cl.

CPC ........ *H04M 1/0264* (2013.01); *G06F 1/1637* (2013.01); *H04M 1/0277* (2013.01); *G03B 29/00* (2013.01); *G06F 1/1609* (2013.01)

(58) Field of Classification Search

None

See application file for complete search history.

(56) References Cited

U.S. PATENT DOCUMENTS 7,898,585 B2 3/2011 Nam
8,471,810 B2 6/2013 Kim et al.

(Continued)

FOREIGN PATENT DOCUMENTS

| | | |
|---|---|---|
| KR | 1020080024662 | 3/2008 |
| KR | 1020130131017 | 12/2013 |
| WO | WO 2014/088469 | 6/2014 |

OTHER PUBLICATIONS

International Search Report dated Jul. 20, 2017 issued in counterpart application No. PCT/KR2017/003592, 9 pages.

*Primary Examiner* — Xanthia C Cunningham
(74) *Attorney, Agent, or Firm* — The Farrell Law Firm, P.C.

(57) ABSTRACT

An electronic device is provided. The electronic device includes a housing including a first surface facing a first direction, a second surface facing a second direction opposite to the first direction, and a side surface extending between and along a perimeter of the first surface and the second surface, a cover glass corresponding to at least the first surface, a display panel disposed under the cover glass and including an active area exposed through the cover glass, an inactive area surrounding the active area, and a printed circuit board connection portion connected to one end of the inactive area, wherein at least one opening or at least one cutaway portion is formed in the display panel, and a camera module disposed in a space formed by the at least (Continued)

one opening or the at least one cutaway portion and exposed through the cover glass.

17 Claims, 25 Drawing Sheets

(56) References Cited

U.S. PATENT DOCUMENTS 8,724,304 B2 5/2014 Raff et al.
9,256,250 B2 2/2016 Raff et al.
9,268,367 B2 2/2016 Aguera y Arcas et al.
9,596,770 B2 * 3/2017 Gao ....................... H01R 35/04
9,640,681 B2 5/2017 Min
9,693,473 B2 * 6/2017 Hibino ..................... H05K 5/03
9,794,455 B2 * 10/2017 Finegold .............. H04N 5/2252
9,829,916 B2 * 11/2017 McClure ............... G06F 1/1626
2008/0068484 A1 3/2008 Nam
2008/0273112 A1 * 11/2008 Sladen ................ H04M 1/0218 348/370
2008/0304222 A1 * 12/2008 Chen ..................... G06F 1/1616 361/679.55
2009/0021903 A1 * 1/2009 Chen ..................... G06F 1/1616 361/679.55
2009/0111515 A1 * 4/2009 Joo ..................... H04M 1/0208 455/556.1
2009/0177607 A1 * 7/2009 Matsushima ........... G06F 3/015 706/46
2010/0053861 A1 3/2010 Kim et al.
2011/0274422 A1 * 11/2011 Lin ....................... G03B 17/02 396/439
2012/0069241 A1 * 3/2012 Shiau .................... G06F 1/1605 348/373
2012/0096373 A1 4/2012 Aguera y Arcas et al.
2012/0105400 A1 * 5/2012 Mathew ............... H04N 5/2251 345/207
2012/0270599 A1 * 10/2012 Mori ................... H04M 1/0254 455/556.1
2013/0137487 A1 * 5/2013 Sato .................. H04M 1/72522 455/566
2013/0178245 A1 * 7/2013 Kulas .................. H04M 1/0264 455/556.1
2013/0223836 A1 * 8/2013 Gibbs ...................... H01Q 9/42 396/535
2013/0279088 A1 10/2013 Raff et al.
2013/0313672 A1 11/2013 Min
2013/0329460 A1 * 12/2013 Mathew ................... H05K 5/02 362/612
2014/0085460 A1 * 3/2014 Park ........................ G06F 21/84 348/135
2014/0184471 A1 7/2014 Martynov et al.
2014/0184521 A1 * 7/2014 Kwong ............... H04M 1/0266 345/173
2014/0218856 A1 8/2014 Raff et al.
2014/0300809 A1 * 10/2014 Oliveira ................. H04N 5/232 348/376
2014/0333830 A1 * 11/2014 Cheon ................. H04M 1/0264 348/376
2014/0334649 A1 * 11/2014 Fromel ................... H04M 1/18 381/189
2015/0065046 A1 * 3/2015 Wilfred ................. H04W 76/14 455/41.2
2015/0089636 A1 3/2015 Martynov et al.
2015/0181413 A1 * 6/2015 Singamsetti ...... H04W 52/0261 455/418
2015/0245514 A1 * 8/2015 Choung ............ G06K 9/00053 361/749
2015/0381929 A1 * 12/2015 Lee ..................... H04M 1/0202 348/14.03
2016/0211876 A1 * 7/2016 Yamamoto ........... H04B 1/3838
2016/0231783 A1 8/2016 Ralf et al.
2016/0239203 A1 * 8/2016 Sato ...................... G06F 3/1423
2017/0126979 A1 * 5/2017 Evans, V ........... G02B 13/0065
2017/0160766 A1 * 6/2017 Gupta ................... G06F 1/1605
2017/0186891 A1 6/2017 Min

* cited by examiner 1400
1410
1430
1440
1460
1470
1480
1485
Active area
Inactive area
1450
1420
1495
1490
1475

ELECTRONIC DEVICE INCLUDING DISPLAY

PRIORITY

This application claims priority under 35 U.S.C. § 119(a) to Korean Patent Application filed on Apr. 1, 2016 in the Korean Intellectual Property Office and assigned Serial number 10-2016-0040398, the entire disclosure of which is incorporated herein by reference.

BACKGROUND

1. Field of the Disclosure

The present disclosure relates to an electronic device including a display that covers a relatively large area of a front surface of the electronic device.

2. Description of the Related Art

With recent developments in mobile communication technologies, electronic devices are typically configured to access wired/wireless communication networks while being easily portable. For example, portable electronic devices, such as smartphones, or tablet personal computers (PCs), may access wireless communication networks using antennas for transmitting and/or receiving wireless signals.

There is ongoing research to increase the size of displays in electronic devices. With increases in the size of the displays, there are often modifications made to the internal structure of the electronic devices and the position of the different components in the electronic devices.

A conventional electronic device may include a home button, a camera, a receiver, an illuminance sensor and/or a proximity sensor disposed in upper and lower portions of the electronic device. However, as the size of the display on a front surface of the electronic device is increased to cover an increasing area of the front surface, there may be challenges associated with the positioning of the components in the electronic device. If the display occupies a relatively greater portion of the front surface of the electronic device, such as for example, if the electronic device includes a full front display, there may be a shortage of space in the electronic device for the positioning of the other components in the electronic device.

SUMMARY

The present disclosure addresses at least the above-mentioned problems and/or disadvantages and provides at least the advantages described below. An embodiment of the present disclosure provides a structure of an electronic device that includes an expanded display panel, which enables the efficient positioning of various components in the electronic device.

According to an embodiment of the present disclosure, an electronic device includes a housing including a first surface facing a first direction, a second surface facing a second direction opposite to the first direction, and a side surface extending between and along a perimeter of the first surface and the second surface, a cover glass corresponding to at least the first surface, a display panel disposed under the cover glass and including an active area exposed through the cover glass, an inactive area surrounding the active area, and a printed circuit board connection portion connected to one end of the inactive area, wherein at least one opening or at least one cutaway portion is formed in the display panel, and a camera module disposed in a space formed by the at least one opening or the at least one cutaway portion and exposed through the cover glass.

According to an embodiment of the present disclosure, an electronic device includes a housing including a first surface facing a first direction, a second surface facing a second direction opposite to the first direction, and a side surface extending between and along a perimeter of the first surface and the second surface, a cover glass, which corresponds to at least the first surface, a display panel including an active area exposed through the cover glass, an inactive area surrounding the active area, and a printed circuit board connection portion connected to one end of the inactive area, wherein a cutaway portion is formed in a corner of the active area, and the display panel is disposed inside the housing and folded such that the cutaway portion is positioned at the folded portion of the display panel, and a camera module is disposed in a space formed by the cutaway portion and exposed through the cover glass.

According to an embodiment of the present disclosure, an electronic device includes a housing including a first surface facing a first direction, a second surface facing a second direction opposite to the first direction, and a side surface extending between and along a perimeter of the first surface and the second surface, a cover glass corresponding to at least the first surface, a display panel including an active area exposed through the cover glass, an inactive area surrounding the active area, a printed circuit board connection portion connected to one end of the inactive area, wherein a first opening is formed in the active area, a second opening is formed in the inactive area or the printed circuit board connection portion, and the display panel is disposed inside the housing and folded so that the first opening overlaps the second opening, and a camera module inserted into the first opening and the second opening and exposed through the cover glass.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
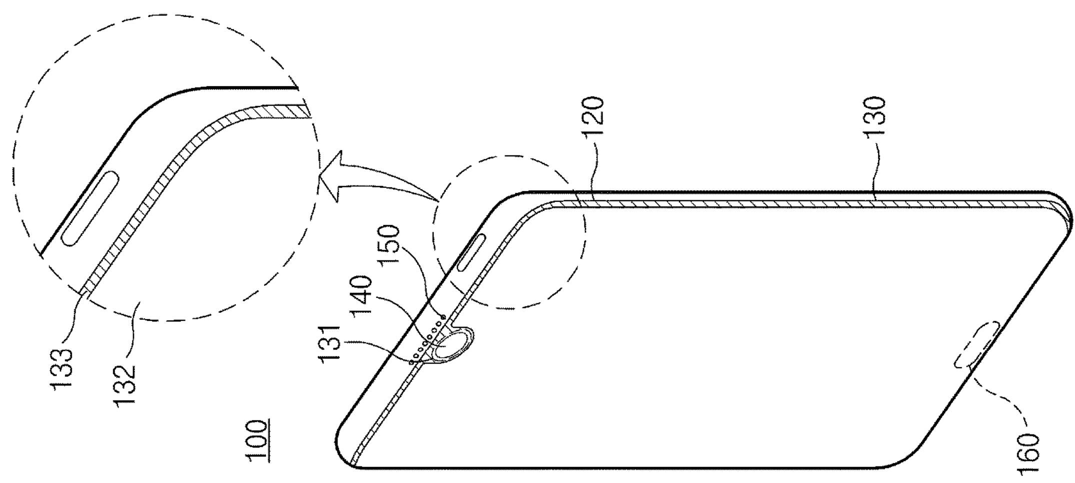
FIG. 1 illustrates a perspective view and six different views of an electronic device, according to an embodiment of the present disclosure.
Figure 1:
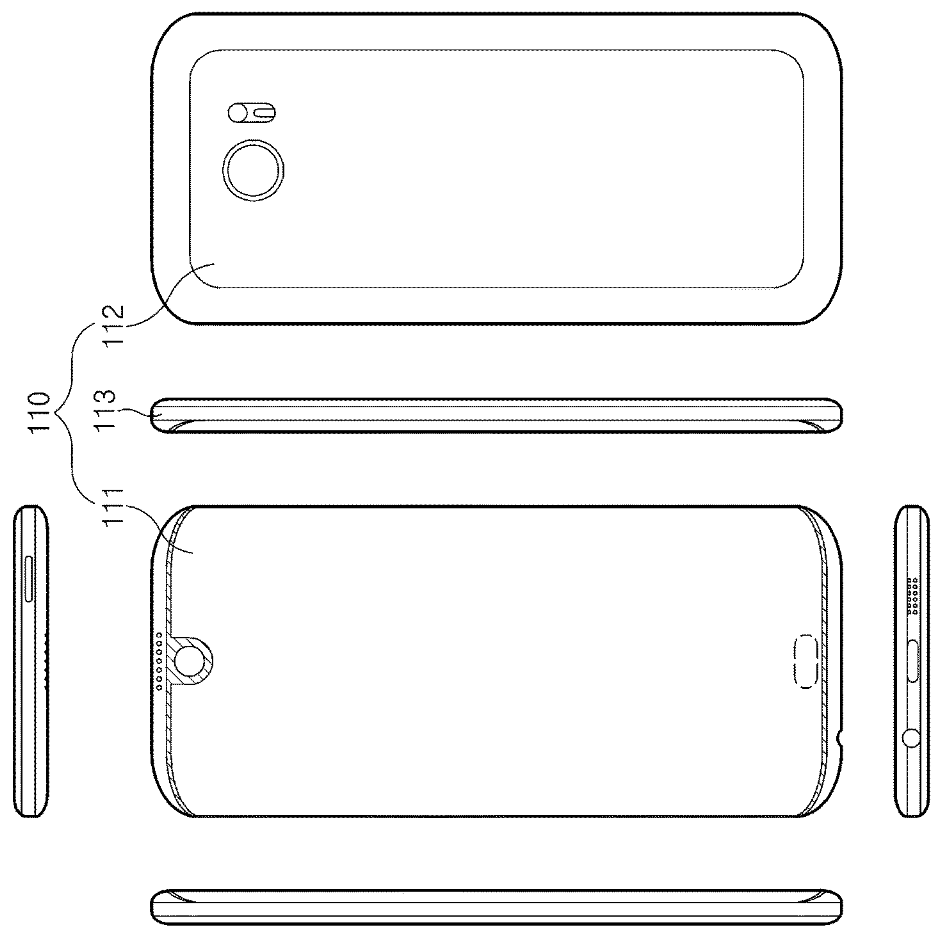

Hereinafter, various embodiments of the present disclosure will be described with reference to the accompanying drawings. Those skilled in the art will recognize that the present disclosure is not limited to the described embodiments, but includes all modifications, equivalents, and/or alternatives as defined by the appended claims and their equivalents.

In the present disclosure, the expressions “have”, “may have”, “include”, “comprise”, “may include” and “may comprise” indicate the presence of corresponding features (e.g. elements such as numeric values, functions, operations, or components) but do not exclude the presence of additional features.

In the present disclosure, the expressions “A or B”, “at least one of A and/or B”, or “one or more of A and/or B”, and the like may include any and all possible combinations of the one or more of the listed items. For example, the term “A or B”, “at least one of A and B”, or “at least one of A or B” may refer to: (1) where at least one A is included, (2) where at least one B is included, or (3) where at least one A and at least one B are included.

The terms, such as “first”, “second”, and the like used in the present disclosure, may be used to refer to different elements of various embodiments of the present disclosure, do not indicate a relative order of the different elements and/or a relative priority of the different elements with respect to each other and are not intended to limit the elements. For example, “a first user device” and “a second user device” refer to different user devices and do not indicate a relative order or a relative priority of the user devices with respect to each other. Without departing from the scope of the present disclosure, a first element may be referred to as a second element, and similarly, a second element may be referred to as a first element.

When an element (e.g. a first element) is referred to as being “(operatively or communicatively) coupled with/to” or “connected to” another element (e.g. a second element), it may be directly coupled with/to or connected to the other element or via an intervening element (e.g. a third element). In contrast, when an element (e.g. a first element) is referred to as being “directly coupled with/to” or “directly connected to” another element (e.g. a second element), it should be understood that there are no intervening elements (e.g. a third element) between the two elements.

The expression “configured to” as used in the present disclosure may be interchangeably used with, for example, the expressions “suitable for”, “having the capacity to”, “designed to”, “adapted to”, “made to”, or “capable of”. The expression “a device configured to” may mean that the device is “capable of” operating together with another device or other components. For example, the expression a “processor configured to (or set to) perform A, B, and C” may refer to a dedicated processor (e.g. an embedded processor) for performing a corresponding operation or a generic-purpose processor (e.g. a central processing unit (CPU) or an application processor) for executing corresponding operations by executing one or more software programs stored in a memory device.

Terms used in the present disclosure are used to describe specific embodiments and are not intended to limit the scope of alternative embodiments. As used herein, singular forms are intended to include plural forms, unless otherwise specified. All the terms used herein, including technical or scientific terms, have the same meaning as generally understood by those skilled in the art. It will be further understood that terms that are defined in a dictionary and commonly used are to be interpreted in the context of the relevant art and are not to be interpreted to have an ideal or excessively formal meaning unless expressly defined as such in the descriptions of the various embodiments of the present disclosure. In some cases, the terms defined in the present disclosure may not be interpreted to exclude embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Moving Picture Experts Group (MPEG-1 or MPEG-2) audio layer 3 (MP3) player, a mobile medical device, a camera, and a wearable device. According to various embodiments, the wearable device may include at least one of an accessory type (e.g. a watch, a ring, a bracelet, an anklet, a necklace, glasses, contact lenses, or a head-mounted-device (I-IMD), a fabric or garment-integrated type device (e.g. an electronic apparel), a body-attaching type device (e.g. a skin pad or tattoos), or a bio-implantable type (e.g. an implantable circuit).

According to various embodiments, the electronic device may be a home appliance. The home appliance may include at least one of, for example, a television (TV), a digital versatile disc (DVD) player, an audio player, a refrigerator, an air conditioner, a cleaner, an oven, a microwave oven, a washing machine, an air cleaner, a set-top box, a home automation control panel, a security control panel, a TV box (e.g. Samsung HomeSync™, Apple TV™, or Google TV™), a game console (e.g. Xbox™ and PlayStation™), an electronic dictionary, an electronic key, a camcorder, an electronic picture frame, and the like.

According to other embodiments, the electronic device may include at least one of a number of different medical devices (e.g. various portable medical measurement devices (e.g. a blood glucose monitoring device, a heartbeat measuring device, a blood pressure measuring device, a body temperature measuring device, and the like), a magnetic resonance angiography (MRA) device, a magnetic resonance imaging (MRI) device, a computed tomography (CT) device, a scanner, and an ultrasonic device), a navigation device, a global navigation satellite system (GNSS) device, an event data recorder (EDR), a flight data recorder (FDR), a vehicle infotainment device, electronic equipment for vessels (e.g. navigation systems and gyrocompasses), an avionics device, a security device, a head unit for vehicles, an industrial or home robot, an automatic teller machine (ATM), a points of sale (POS) device in stores, or an Internet of things (IoT) device (e.g. a light bulb, various sensors, an electric or gas meter, a sprinkler device, a fire alarm, a thermostat, a street lamp, a toaster, exercise equipment, a hot water tank, a heater, a boiler, and the like).

According to other embodiments, the electronic device may include at least one of a part of furniture or building/structure, an electronic board, an electronic signature receiving device, a projector, or one of a number of different measuring instruments (e.g. a water meter, an electricity meter, a gas meter, or a wave meter, and the like). The electronic device may be any one of the above-described devices or may be a combination of the above-described devices. Furthermore, the electronic device may not be limited to the above-described electronic devices and may include other electronic devices and new electronic devices based on the development of new technologies.

Hereinafter, various embodiments of electronic devices will be described with reference to the accompanying drawings. In the present disclosure, the term "user" may refer to a person who uses an electronic device or may refer to a device (e.g. an artificial intelligence electronic device) that uses the electronic device.

FIG. 1 illustrates a perspective view and six different views of an electronic device, according to an embodiment of the present disclosure.

Referring to FIG. 1, an electronic device 100 may include a housing 110, a cover glass 120, a display panel 130, a camera module 140, a receiver hole 150, and a home button 160.

The housing 110 may include a first surface 111 (a front surface) facing a first direction, a second surface 112 (a rear surface) facing a second direction opposite the first direction, and a side surface 113 extending between and along the perimeter of the first surface 111 and the second surface 112. The rear surface 112 refers to a surface opposite the front surface 111.

The cover glass 120 may protect components of the electronic device 100, such as for example, the display panel 130 of the electronic device 100 and the like. The cover glass 120 may correspond to at least the front surface 111. For example, the cover glass 120 may cover a relatively large portion of the area of the front surface 111. The cover glass 120 may cover an area defined by the front surface 111 and a portion of an area of the side surface 113. The cover glass 120 may include a flat surface. Alternatively, the cover glass 120 may have curved surfaces formed as a top end, a bottom end, a left-side end and/or a right-side end of the cover glass 120. The cover glass 120 may be formed from a transparent material. For example, the cover glass 120 may be formed from a material such as tempered glass, plastic (e.g. PET), or aluminum oxide.

The display panel 130 may be disposed under the cover glass 120. The display panel 130 may be disposed inside the housing 110 and may include curved surfaces at a left-side end, a right-side end, a top end and/or a bottom end of the display panel 130.

The display panel 130 may cover a relatively large portion of the area of the front surface 111 of the electronic device 100. As the area of the display panel 130 that covers the front surface 111 is increased, the positions of other components of the electronic device 100 may be changed. For example, components, such as the camera module 140, the receiver, and the like, may be positioned at an outermost portion of the front surface 111 of the electronic device.

The display panel 130 may include an active area 132, an inactive area 133, and a printed circuit board (PCB) connection portion.

The active area 132 may be exposed through a transparent area of the cover glass 120. The active area 132 may emit light depending on an electrical signal supplied through a scan line and a data line. The active area 132 may have an aspect ratio of, for example, 19:9.

According to an embodiment, the active area 132 may cover the area of the front surface 111 and an area along at least a portion of the side surface 113. For example, the active area 132 may cover the entire area of the front surface 111 and the entire area along the side surface 113. The active area 132 of the electronic device 100 may be relatively closer to the side surface 113 as compared to an active area of a typical prior art electronic device. The portion of the active area 132 corresponding to the side surface 113 may operate as a soft key to adjust a volume of sound. The position of the soft key may be changed based on a grip state or a use history of a user. The active area 132 may cover a relatively large portion of the area of the front surface 111, for example, the active area 132 may cover about 90% or more of an area of the front surface 111.

According to various embodiments, a peripheral portion of the active area 132 may be a black matrix (BM) area. A light emitting layer may be provided under the BM area of the display panel 130. The color of the BM area may be varied depending on the actions of the light emitting layer under the BM layer.

According to an embodiment, the color of the BM area may be varied depending on a condition surrounding the BM area. For example, the color of the BM area may be varied depending on the color of an opaque area printed on a peripheral portion of the cover glass 120. If the color of the opaque area is white, the color of the BM area may be changed to white. If the color of the opaque area is black, the color of the BM area may be changed to black.

According to an embodiment, the BM area may be an area of the active area 132 that is not used to display an image.

For example, when a picture with an aspect ratio of 4:3 is generated for display, a top end area and a bottom end area of the active area 132, where the picture is not displayed may be the BM areas. Alternatively, in the case where a video with an aspect ratio of 16:9 is generated for display, the top end area and the bottom end area of the active area 132 may be included in the area that is used to for the video is display and may be the BM areas. Colors of the BM areas may be varied depending on surrounding conditions, for example, the colors of opaque areas.

The inactive area 133 may be an area surrounding the active area 132. According to an embodiment, the inactive area 133 of the electronic device 100 may be relatively narrower than an inactive area of a typical prior art electronic device. At least a portion of the inactive area 133 may be exposed through the cover glass 120. For example, the inactive area 133, in a peripheral portion of the display panel 130, may be an area hidden by an opaque masking layer. The opaque masking layer may be formed by printing a layer on the cover glass 120. A portion of the inactive area 133 formed in direction along a width of the cover glass 120 and a portion of the inactive area 133 formed in a direction along a length of the cover glass 120 may have a thickness ratio of, for example, 1:1, 2:1, or 3:1. Alternatively, a top end, a side end, and a bottom end of the inactive area 133 may have a thickness ratio of, for example, 2:1:4.

As mentioned above, the display panel 130 includes an active area 132, an inactive area 133, and a PCB connection portion. The PCB connection portion may be connected to one end of the inactive area 133. The scan line and the data line disposed in the active area 132 may be connected to a PCB via the PCB connection portion. The display panel 130 may include at least one opening 131 or at least one cutaway portion. For example, the display panel 130 may include an opening 131 formed at a top end of the active area 132. In an embodiment, the display panel 130 is folded along a diameter of the opening 131, and the folded opening 131 may form a U-shaped opening. The folded display panel 130 may be positioned inside the housing 110 with the opening 131 positioned at the folded portion of the display panel 130. If the display panel 130 is folded along the diameter of the opening 131, the opening 131 may form the U-shaped opening when viewed from the the front surface 111 side of the electronic device 100. The display panel 130 and the opening 131 will be described in detail with reference to FIG. 12. Various components of the electronic device 100 may be exposed through the space formed by the opening 131 in the display panel 130.

If the opening 131 is formed in the display panel 130, a portion of the active area 132 that is used to output light may be lost. The size of the opening 131 formed in the display panel 130 may be larger than a specific size due to limitations in the manufacturing process. When the opening 131 is formed in the display panel 130, the diameter of the active area 132 lost by the opening 131 may be, for example, about 8.34 mm or more. When the display panel 130 is folded such that the opening 131 is positioned at the folded portion of the display panel 130, the area of the opening 131 may be reduced when viewed from the front surface 111 side of the electronic device 100. For example, if the diameter of the active area 132 that is lost when the opening 131 is formed is about 8.34 mm, the diameter of the space that is formed by the opening 131 when the display panel 130 is folded may be about 4.95 mm when viewed from the the front surface 111 side of the electronic device 100.

As described above, after the opening 131 is formed in the display panel 130, the display panel 130 is folded along a diameter of the opening 131 such that the opening 131 is positioned at the folded portion of the display panel 130 thereby reducing the size of the opening 131 exposed through the front surface 111.

A touch screen display may refer to a module including a touch screen, a cover glass and/or a polarization plate in addition to the display panel 130.

The camera module 140 may be disposed at a position corresponding to the at least one opening 131 or the at least one cutaway portion of the display panel 130. For example, the camera module 140 may be disposed in a space formed by the at least one opening 131 or the at least one cutaway portion. For example, the camera module 140 may be disposed in a space formed by the opening 131 formed in the top end of the active area 132. The camera module 140 may be exposed through the cover glass 120. For example, the camera module 140 may be viewed to through the cover glass 120 when the camera module 140 is disposed under the cover glass 120. The camera module 140 may sense light incident thereto and external to the electronic device 100 through the cover glass 120, thereby acquiring an image.

According to an embodiment, the camera module 140 may be positioned such that the camera module 140 is exposed through the center of a top end of the cover glass 120. Since the camera module 140 is positioned at the center of the top end of the cover glass 120, a focal point may easily be set when an image is acquired using a camera exposed through the cover glass 120 disposed on the front surface 111 of the electronic device 100. The aesthetic appearance of the electronic device 100 may be improved.

According to an embodiment, the camera module 140 may be disposed adjacent to an outer portion of the front surface 111 so as to minimize an influence of the presence of the camera module 140 on the appearance of the front surface 111 of the housing 110.

A receiver hole 150 may be used to transmit a sound generated by a receiver disposed within the housing 110. The receiver hole 150 may be formed in the side surface 113 of the housing 110. For example, the receiver hole 150 may be formed in a metallic frame of the side surface 113. As illustrated in FIG. 1, the electronic device 100 may include a plurality of receiver holes 150. The receiver hole 150 is formed in the side surface 113 to transmit the sound generated by the receiver so as to minimize the impact of the presence of the receiver hole 150 on the display panel 130 occupying the front surface 111 area of the electronic device 100. Although FIG. 1 illustrates that the receiver hole 150 is formed in the side surface 113 of the housing 110, the present disclosure is not limited thereto. For example, the receiver hole may be formed in the top end of the front surface 111 of the housing 110. In addition, if the receiver of the electronic device 100 includes a piezo-speaker, the electronic device may not include a receiver hole 150.

The home button 160 may be disposed at a bottom end of the front surface 111 of the electronic device 100. The home button 160 may be a physical key or a soft key. If the home button 160 is a physical key, the opening 131 or the cutaway portion may be formed in a bottom end of the active area 132 of the display panel 130. The home button 160 may be disposed in the opening 131 or the cutaway portion.

The home button 160 may be implemented with a soft key positioned at the bottom end of the front surface 111 of the electronic device 100. If the home button 160 is a soft key, a fingerprint sensor may be disposed under the area of the display panel 130 for the home button 160. The cover glass 120 may include a recess formed above the fingerprint sensor.

As described above, the electronic device 100 may include the display panel 130, that is visible through the front surface 111 of the electronic device 100, and the camera module 140 positioned within the display panel 130.

For example, at least a portion of the active area 132 of the display panel 130, at least a portion of the inactive area 133, and at least a portion of the camera module 140 may be visible through the front surface 111. Alternatively, the active area 132 of the display panel 130 and the camera module 140 may be exposed through the front surface 111, and the inactive area 133 of the display panel 130 may be disposed under the side surface 113 or the rear surface 112.

Figure 2:
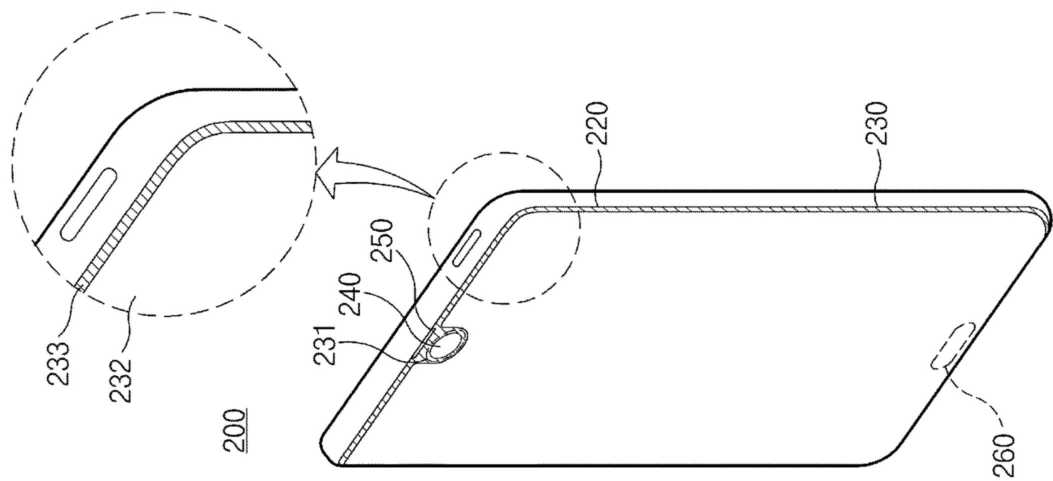
FIG. 2 illustrates a perspective view and six different views of an electronic device, according to an embodiment of the present disclosure.
Figure 2:
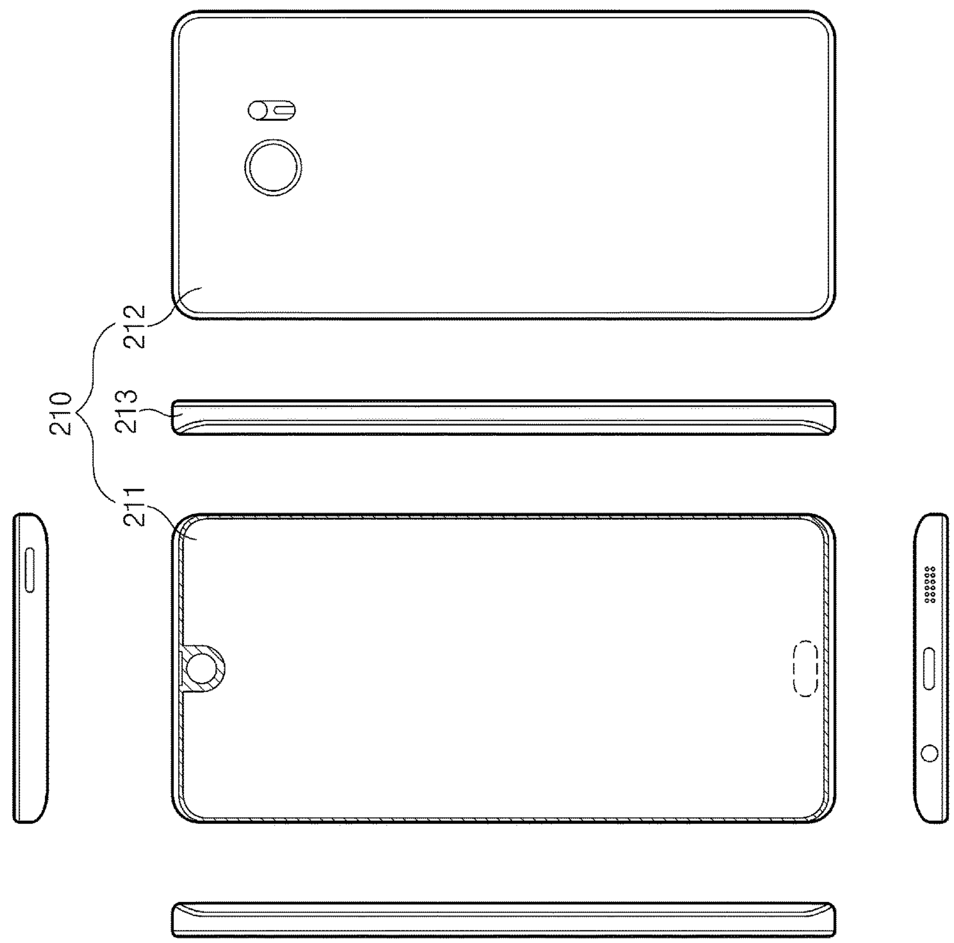

FIG. 2 illustrates a perspective view and six different views of an electronic device, according to an embodiment of the present disclosure.

Referring to FIG. 2, an electronic device 200 may include a housing 210, a cover glass 220, a display panel 230, a camera module 240, a receiver hole 250, and a home button 260.

The housing 210 may include a front surface 211, a rear surface 212, and a side surface 213. The housing 210 may be slightly curved along an edge thereof. The side surface 213 of the housing 210 may include a flat surface.

The cover glass 220 may cover a relatively large area of the front surface 211 of the electronic device 200. The cover glass 220 may have a flat surface, or may have curved surfaces along a left-side end and/or a right-side end of the electronic device 200.

The display panel 230 may be disposed under the cover glass 220. The display panel 230 may be disposed inside the housing 210 and may include curved surfaces at the left-side end and the right-side end of the display panel 230. The display panel 230 may include an active area 232, an inactive area 233, and a PCB connection port, similar to the display panel 130 of FIG. 1.

For example, the camera module 240 may be disposed in a space formed by an opening 231 formed in a top end of the active area 232. The camera module 240 may be exposed through the cover glass 220. The camera module 240 may sense light incident thereto and external to the electronic device 200 through the cover glass 220 thereby acquiring an image.

The receiver hole 250 may be used to transmit a sound generated by a receiver disposed within the housing 210. The receiver hole 250 may be formed in a top end of the front surface 211 of the housing 210. The receiver hole 250 is formed in the top end so as to minimize the impact of the presence of the receiver hole 250 on the display panel 230. Although FIG. 2 illustrates that the receiver hole 250 is formed in the top end of the front surface 211 of the housing 210, the present disclosure is not limited thereto. For example, the receiver hole 250 may be formed in the side surface 213 of the housing 210. In addition, if the receiver of the electronic device 200 includes a piezo-speaker, the electronic device 200 may not include a receiver hole 250.

The home button 260 may be disposed at a bottom end of the front surface 211 of the electronic device 200. The home button 260 may be a physical key or a soft key.

As described above, the electronic device 200 may include the display panel 230 that is visible through the front surface 211 of the electronic device 200, and the camera module 240 positioned inside the display panel 230.

Figure 3:
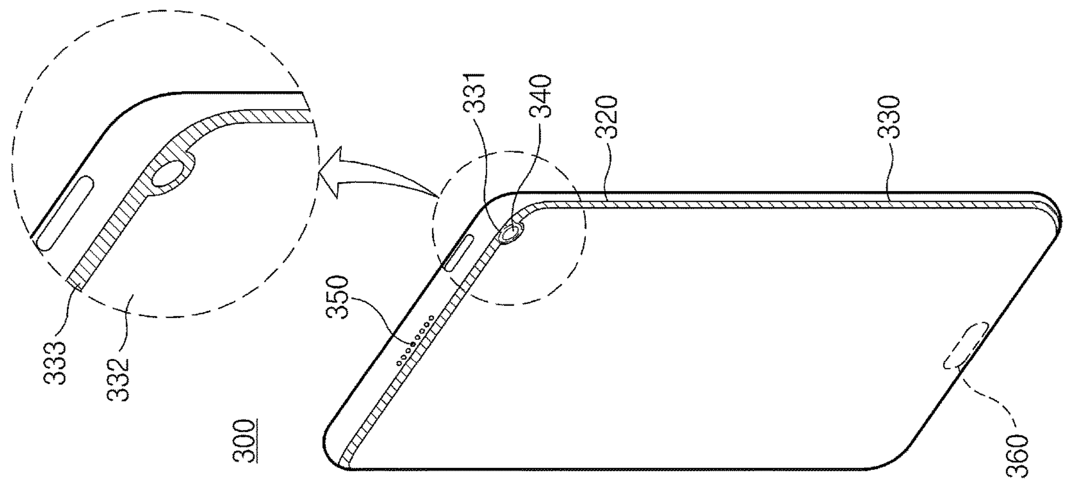
FIG. 3 illustrates a perspective view and six different views of an electronic device, according to an embodiment of the present disclosure.
Figure 3:
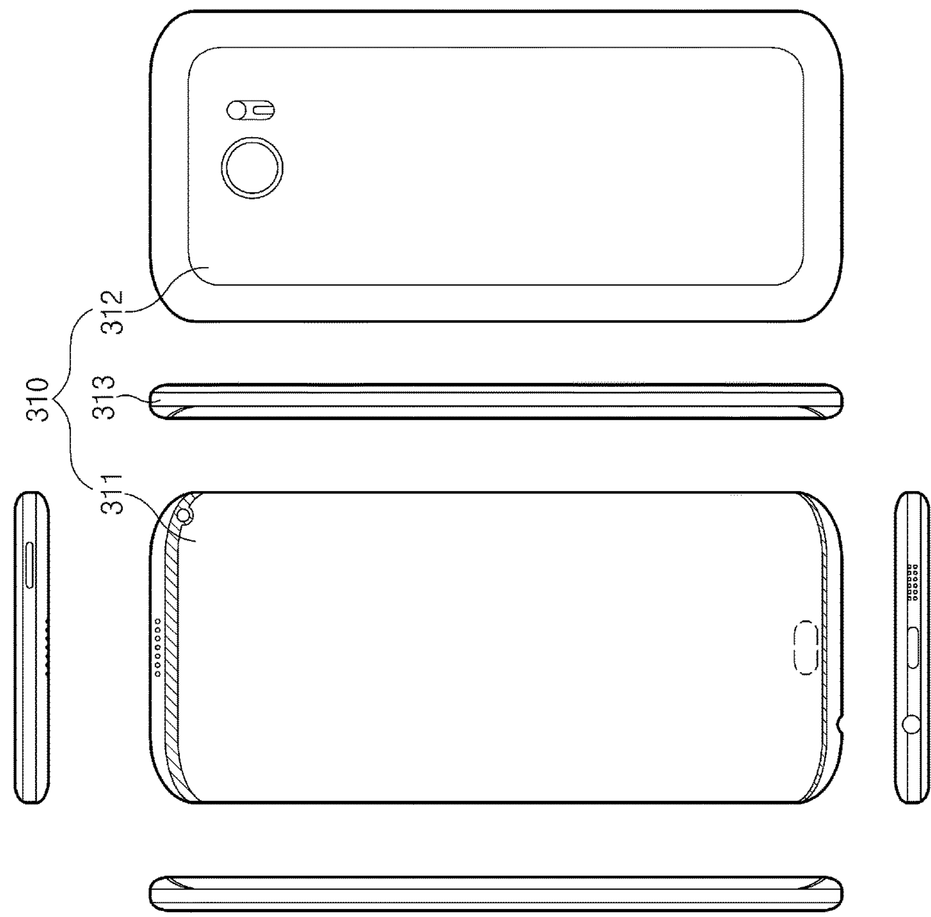

FIG. 3 illustrates a perspective view and six different views of an electronic device, according to an embodiment of the present disclosure.

Referring to FIG. 3, an electronic device 300 may include a housing 310, a cover glass 320, a display panel 330, a camera module 340, a receiver hole 350, and a home button 360. The housing 310, the cover glass 320, the receiver hole 350, and the home button 350 illustrated in FIG. 3 may have generally the same configuration as the housing 110, the cover glass 120, the receiver hole 150, and the home button 160 illustrated in FIG. 1.

The display panel 330 may be disposed under the cover glass 320. The display panel 330 may be disposed inside the housing 310 and may include curved surfaces at a top end, a bottom end, a left-side end and/or a right-side end of the display panel 330. The display panel 330 may include an active area 332, an inactive area 333, and a PCB connection portion, similar to the display panel 130 of FIG. 1.

According to an embodiment, a cutaway portion 331 may be formed in a corner of the active area 332 of the display panel 330 in a concave shape. For example, the cutaway portion 331 may be formed in a left top end or a right top end of the active area 332 of the display panel 330. The display panel 330 is folded about the cutaway portion such that the cutaway portion 331 may form an L-shaped space when viewed from the front surface 311 side of the electronic device 300, as illustrated in FIG. 3. The display panel 330 may be positioned inside the housing 310 with the cutaway portion 331 positioned at the folded portion of the display panel 330. For example, the display panel 330 may be folded about the cutaway portion 331. Various components of the electronic device 300 may be exposed through the space formed by the cutaway portion 331 in the display panel 330. For example, the camera module 340 may be disposed in the space formed by the cutaway portion 331. The display panel 330 and the cutaway portion 331 will be described in detail with reference to FIG. 12 below.

If the cutaway portion 331 is formed in the display panel 130, a portion of the active area 332 that is used to output light, may be lost and may impact the design of the electronic device 300. In addition, the size of the cutaway portion 331 formed in the display panel 330 may be larger than a specific size due to limitations in the manufacturing process. When the display panel 330 is folded such that the cutaway portion 331 is positioned at the folded portion of the display panel 330, the area of the cutaway portion 331 may be reduced when viewed from the front surface 311 side of the electronic device 300.

As described above, after the cutaway portion 331 is formed in the display panel 330 and the display panel 330 is folded such that the cutaway portion 331 is positioned at the folded portion of the display panel 330 thereby reducing the size of the cutaway portion 331 exposed through the front surface 311.

According to an embodiment, the display panel 330 may include a first opening formed in the active area 332 and a second opening formed in an inactive area 333 or in a PCB connection portion. The display panel 330 may be positioned inside the housing 310 with the display panel 330 folded so that the first opening overlaps the second opening. If the display panel 330 is folded such that the first opening overlaps the second opening, the first opening and the second opening may form an O-shaped space when viewed from the front surface 311 side of the electronic device 300. Various modules of the electronic device 300 may be exposed through the space formed by the first opening and the second opening. For example, the camera module 340 may be disposed in the space formed by the first opening and the second opening. The above-described display panel 330, the first opening, and the second opening will be described in detail with reference FIG. 12 below.

As illustrated in FIG. 3, if the camera module 340 is exposed through the left top end or the right top end of the cover glass 320, a physical user interface (PUI) may be provided.

Figure 4:
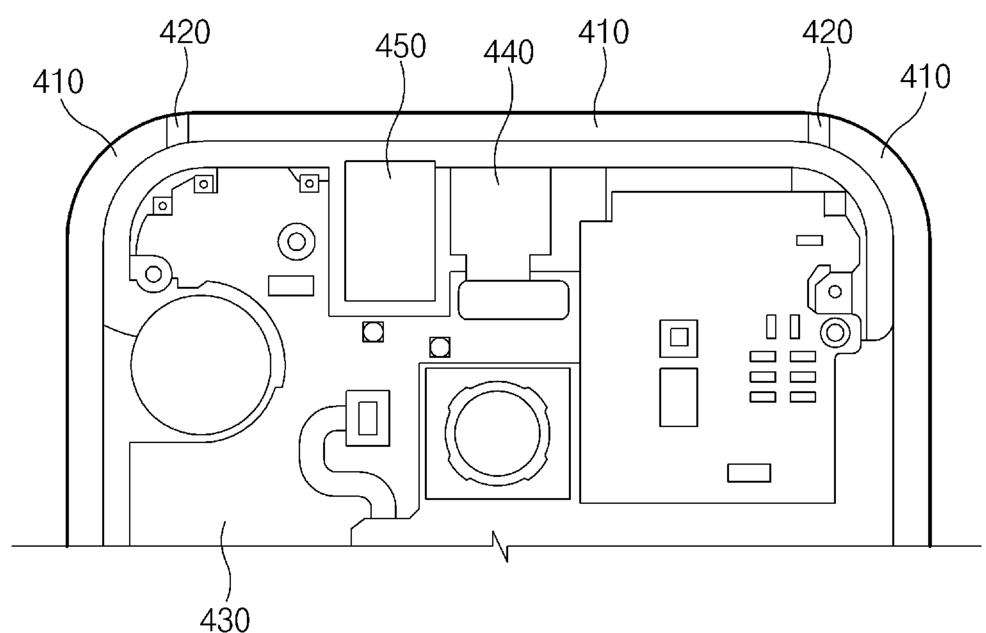
FIG. 4 illustrates an internal structure of an upper portion of an electronic device, according to an embodiment of the present disclosure.

FIG. 4 illustrates an internal structure of an electronic device, according to an embodiment of the present disclosure.

Referring to FIG. 4, an electronic device 400 may include a metallic frame 410, a cutaway portion 420, a PCB 430, a camera module 440, and a receiver 450.

The metallic frame 410 may form at least a portion of a side surface of the electronic device 400. A left-side end and a right-side end of the metallic frame 410 may be relatively thinner than a top end and a bottom end of the metallic frame 410. The metallic frame 410 may be a lateral-side housing of the electronic device 400. The metallic frame 410 may function as an antenna radiator of the electronic device 400. The metallic frame 410 may include a plurality of conductors. The metallic frame 410 may include at least one cutaway portion 420.

The cutaway portion 420 may be interposed between the conductors included in the metallic frame 410. For example, the cutaway portions 420 may be positioned in a left top end and a right top end of the metallic frame 410. The cutaway portion 420 may form a portion of the side surface of the electronic device 400. The cutaway portion 420 may include an insulator that prevents current from being conducted.

The camera module 440 may be disposed at the center of the top end of the PCB 430.

The receiver 450 may have a rectangular shape when viewed from the front. The receiver 450 may be disposed at a top end of the PCB 430 and transmit sound through a hole of the receiver 450. If the camera module 440 is disposed at the center of the top end of the PCB 430, a relatively longer edge of the receiver 450 may be disposed in a lengthwise direction. The receiver 450 may include a piezo-speaker. When the speaker included in the receiver 450 is a piezo-speaker and a receiver hole is not formed in the housing of the electronic device 400, a sound generated from the receiver 450 may still be transmitted outside the electronic device 400.

Figure 5:
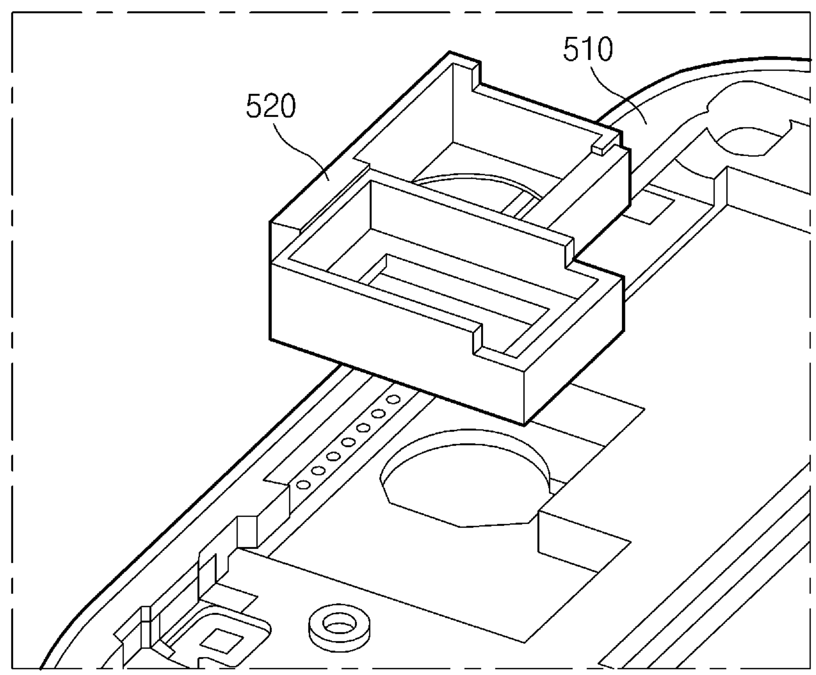
FIG. 5 illustrates an internal structure of an upper portion of an electronic device, according to an embodiment of the present disclosure.

FIG. 5 illustrates an internal structure of an electronic device, according to an embodiment of the present disclosure.

Referring to FIG. 5, an electronic device 500 may include a metallic frame 510 and a bracket 520.

The metallic frame 510 may include at least one receiver hole formed in the center of a top end of the metallic frame 510.

The bracket 520 may be configured to receive at least one module. For example, the bracket 520 may be configured to receive the camera module and the receiver. The bracket 520 may be configured to receive the camera module on the left side and the receiver on the right side. The bracket 520 may include holes to enable the mounting of the camera module and the receiver. The bracket 520 may be mounted in a housing such that the camera module is disposed at the center of the top end of the electronic device 500.

The bracket 520 may function as a duct which guides the sound generated from the receiver to the receiver hole. Given the positioning of the camera module, the length of the duct in an embodiment may relatively longer than that of a typical duct. The sound generated from the receiver may be transmitted to the receiver hole along the bracket 520 and then may be output outside of the electronic device 500.

Figure 6:
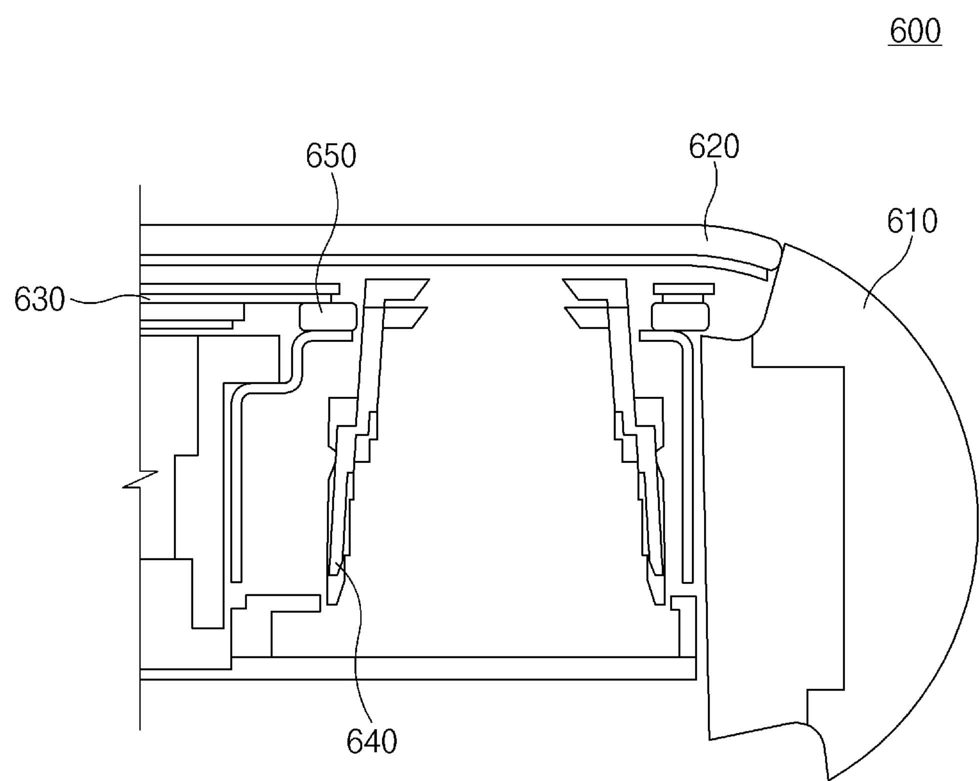
FIG. 6 is a sectional view illustrating an upper portion of an electronic device, according to an embodiment of the present disclosure.

FIG. 6 is a sectional view illustrating an upper portion of an electronic device, according to an embodiment of the present disclosure.

Referring to FIG. 6, an electronic device 600 may include a metallic frame 610, a cover glass 620, a display panel 630, a camera module 640, and a buffer member 650.

The metallic frame 610 may form at least a portion of a lateral-side housing of the electronic device 600. The metallic frame 610 may be laterally adjacent to the cover glass 620, the display panel 630, and the camera module 640.

The cover glass 620 may be disposed adjacent to the metallic frame 610. The cover glass 620 may form at least a portion of a front-surface housing of the electronic device 600.

The display panel 630 may be disposed under the cover glass 620. The display panel 630 may include an opening or a cutaway portion.

The camera module 640 may be disposed in a space formed by the opening or the cutaway portion formed in the display panel 630. Since the camera module 640 is disposed in the space formed by the opening or the cutaway portion, the camera module 640 may be exposed through the cover glass 620, and light external to the electronic device 60 may be incident into the camera module 640.

The buffer member 650 may be interposed between the camera module 640 and the display panel 630. The buffer member 650 may mitigate impact between the camera module 640 and the display panel 630. The buffer member 650 may prevent dust or moisture from being introduced into the camera module 640. For example, the buffer member 650 may include a sponge, a tape, or a bonding material.

Figure 7A:
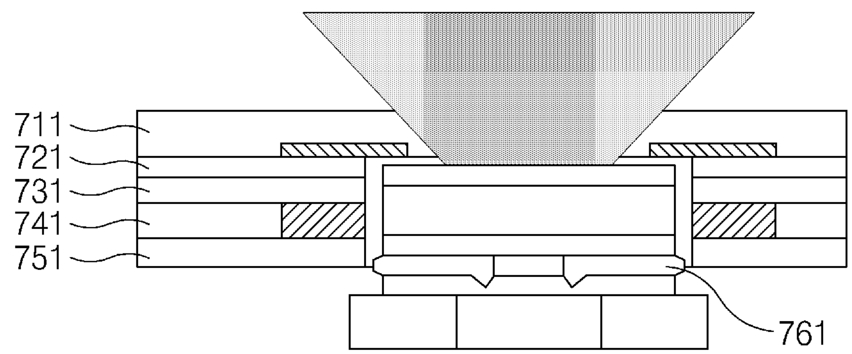
FIGS. 7A, 7B and 7C are sectional views illustrating an upper portion of an electronic device, according to an embodiment of the present disclosure.
Figure 7B:
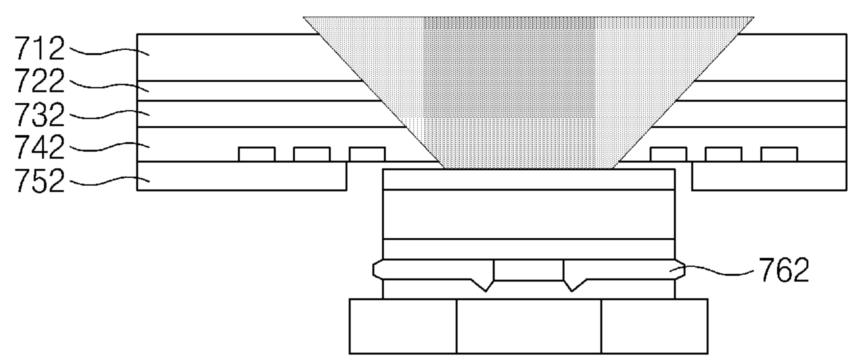
Figure 7C:
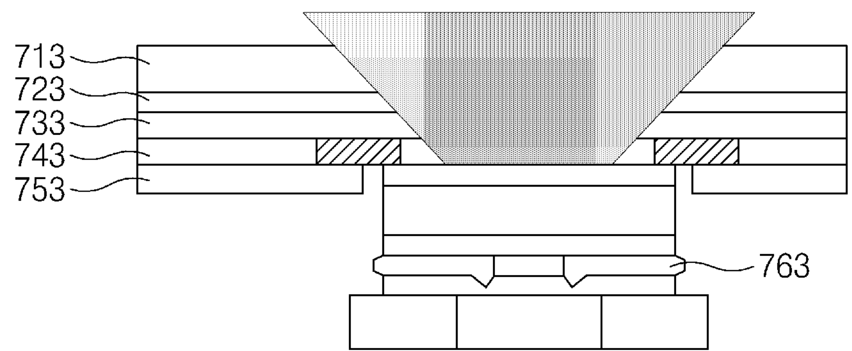

FIGS. 7A, 7B and 7C are sectional views illustrating an upper portion of an electronic device, according to an embodiment of the present disclosure.

Referring to FIGS. 7A, 7B and 7C, electronic devices 701, 702, and 703 may include cover glasses 711, 712, and 713, optical clear adhesives (OCAs) 721, 722, and 723, polarizing plates 731, 732, and 733, display panels 741, 742, and 743, rear members 751, 752, and 753, and camera modules 761, 762, and 763, respectively.

Referring to FIG. 7A, the camera module 761 may be inserted into an opening formed in the OCA 721, the polarizing plate 731, the display panel 741, and the rear member 751. The camera module 761 may be exposed through the cover glass 711.

Referring to FIG. 7B, the camera module 762 may be inserted into an opening formed in the rear member 752. In this case, a light emitting device and/or a driving device disposed adjacent to the camera module 762 may be omitted from the display panel 742. The camera module 762 may be exposed through the cover glass 712, the OCA 722, the polarizing plate 732, and the display panel 742.

Referring to FIG. 7C, the camera module 763 may be inserted into an opening formed in the rear member 753. In this case, an area adjacent to the camera module 763 may be removed from the display panel 743 to ensure transmittance. The camera module 763 may be exposed through the cover glass 713, the OCA 723, and the polarizing plate 733.

Figure 8:
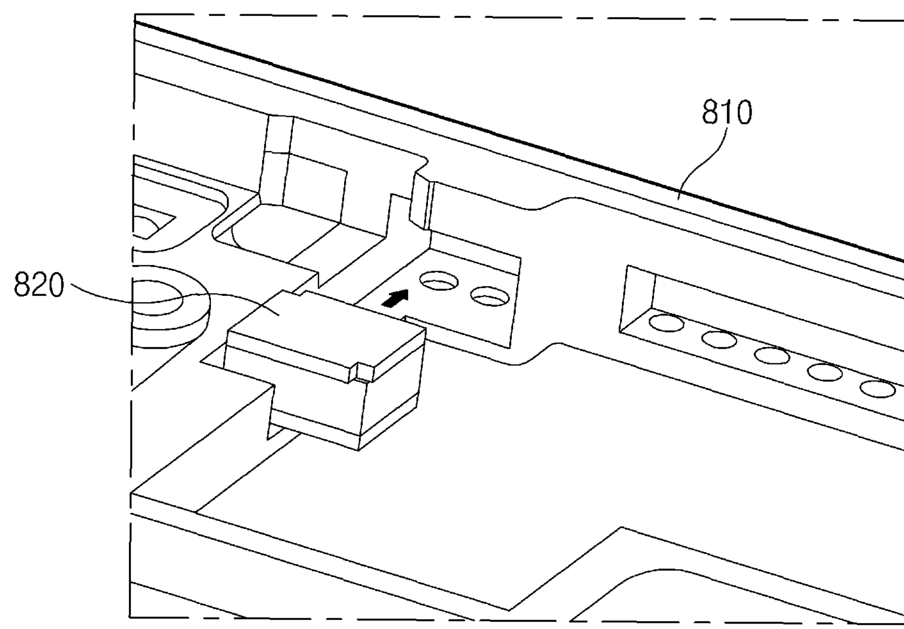
FIG. 8 illustrates an internal structure of an upper portion of an electronic device, according to an embodiment of the present disclosure.

FIG. 8 illustrates an internal structure of an upper portion of an electronic device, according to an embodiment of the present disclosure.

Referring to FIG. 8, an electronic device 800 may include a housing 810 and a sensor module 820.

According to an embodiment, the housing 810 may include at least one hole to expose the sensor module 820 outside the electronic device 800. The housing 810 may include at least one hole formed in an outer portion of a display panel. For example, the housing 810 may include at least one hole formed in a position corresponding to an opening or a cutaway portion formed in the display panel. Alternatively, the housing 810 may include at least one hole formed in a side surface of the housing 810. Alternatively, the housing 810 may include at least one hole formed in an outer portion of a front surface of the housing 810. The housing 810 may include a structure in which the sensor module 820 is mounted.

The sensor module 820 may be mounted in the housing 810. If the sensor module 820 is mounted in the housing 810, the sensor module 820 may perform a sensing operation through the hole formed in the housing 810. For example, the sensor module 820 may include a proximity sensor and/or an illuminance sensor. The sensor module 820 may sense illuminance through the hole formed in the housing 810 and may sense the proximity of an object.

Figure 9:
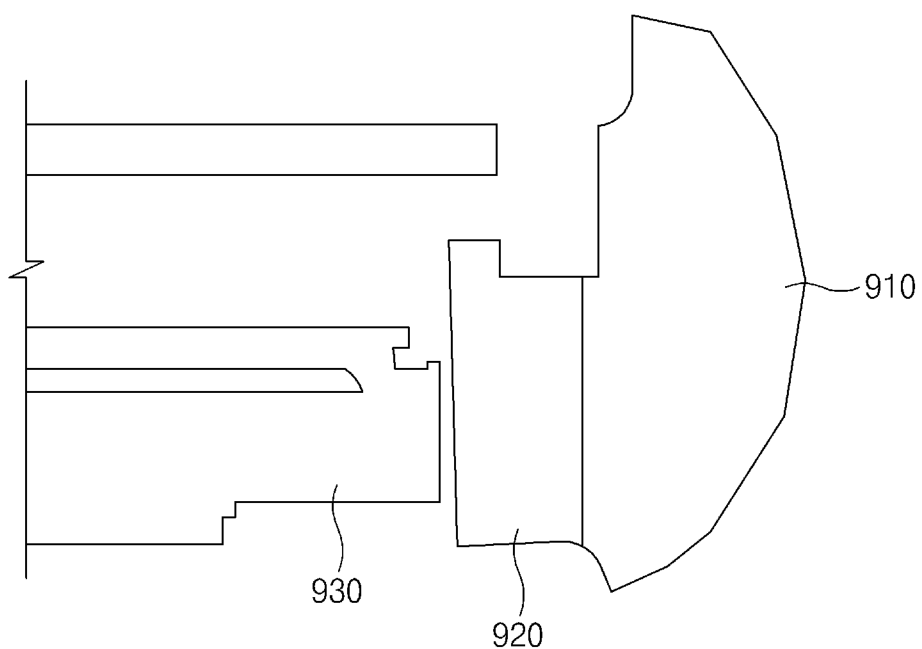
FIG. 9 is a sectional view illustrating an upper portion of an electronic device, according to an embodiment of the present disclosure.

FIG. 9 is a sectional view illustrating an upper portion of an electronic device, according to an embodiment of the present disclosure.

Referring to FIG. 9, an electronic device 900 may include a metallic frame 910, an internal housing 920, and a receiver 930.

The metallic frame 910 may form at least a portion of a lateral-side housing of the electronic device 900. The metallic frame 910 may be laterally adjacent to the internal housing 920.

The internal housing 920 may be laterally adjacent to the metallic frame 910. The internal housing 920 may receive a receiver 930.

The metallic frame 910 and/or the internal housing 920 may include a receiver hole having a relatively longer length in a direction in which the metallic frame 910 and/or the internal housing 920 extend. The receiver hole may be interposed between the metallic frame 910 and a cover glass. The sound generated from the receiver 930 may be output the outside of the electronic device 900 through the receiver hole.

The receiver 930 may be mounted inside the internal housing 920. The receiver 930 may be positioned to allow sound generated from the receiver 930 to be transmitted to the receiver hole.

Figure 10:
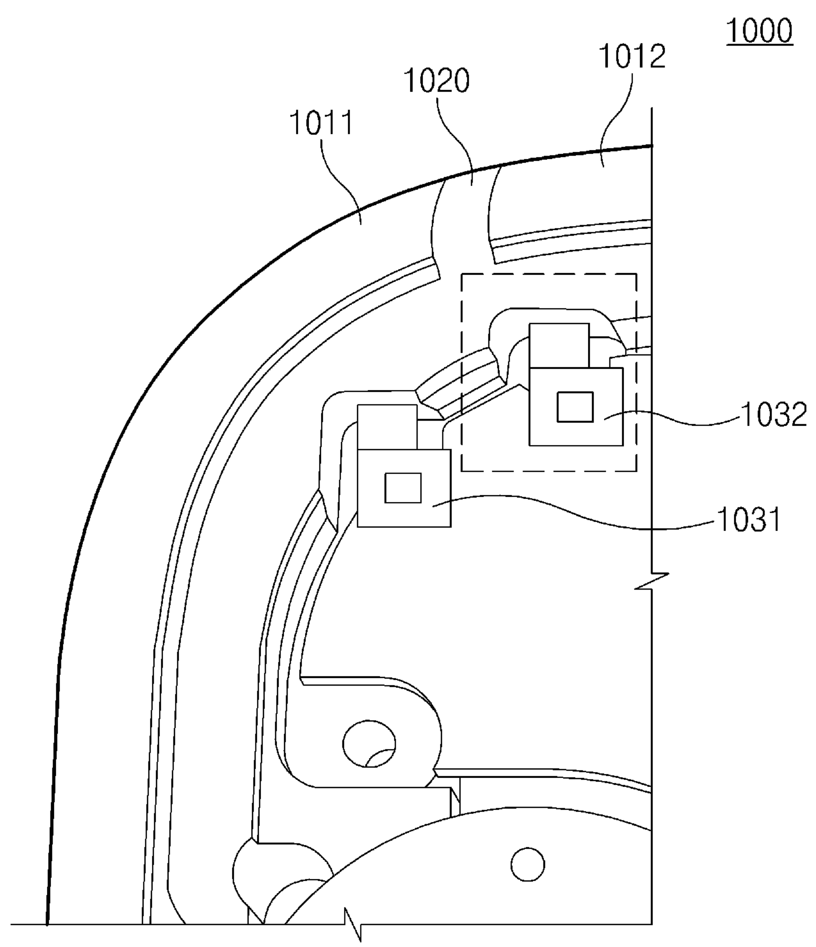
FIG. 10 illustrates an internal structure of a left top end of an electronic device, according to an embodiment of the present disclosure.

FIG. 10 illustrates an internal structure of a left top end of an electronic device, according to an embodiment of the present disclosure.

Referring to FIG. 10, an electronic device may include metallic frames 1011, 1012, a cutaway portion 1020, connection members 1031, 1032, and a substrate 1040.

The metallic frames 1011, 1012 may form at least a portion of the lateral-side housing of the electronic device 1000. The metallic frames 1011, 1012 may function as an antenna radiator of the electronic device 1000. The metallic frame 1011, 1012 may include a plurality of conductors. The metallic frames 1011, 1012 may include at least one cutaway portion 1020.

The cutaway portion 1020 may be interposed between the conductors included in the metallic frames 1011, 1012. For example, the cutaway portion 1020 may be positioned at the left top end of the metallic frames 1011, 1012. The cutaway portion 1020 may include an insulator that prevents current from being conducted. The cutaway portion 1020 may include a reinforcement protrusion structure to enhance the strength of the cutaway portion 1020.

The connection members 1031, 1032 may connect the metallic frames 1011, 1012 with the substrate 1040. For example, the connection members 1031, 1032 may make contact with the metallic frames 1011, 1012. The connection members 1031, 1032 may make contact with the exposed portions of the metallic frames 1011, 1012 and may be utilized as contact points with the antenna radiator. The connection members 1031, 1032 may be fixed onto the substrate 1040.

Figure 11:
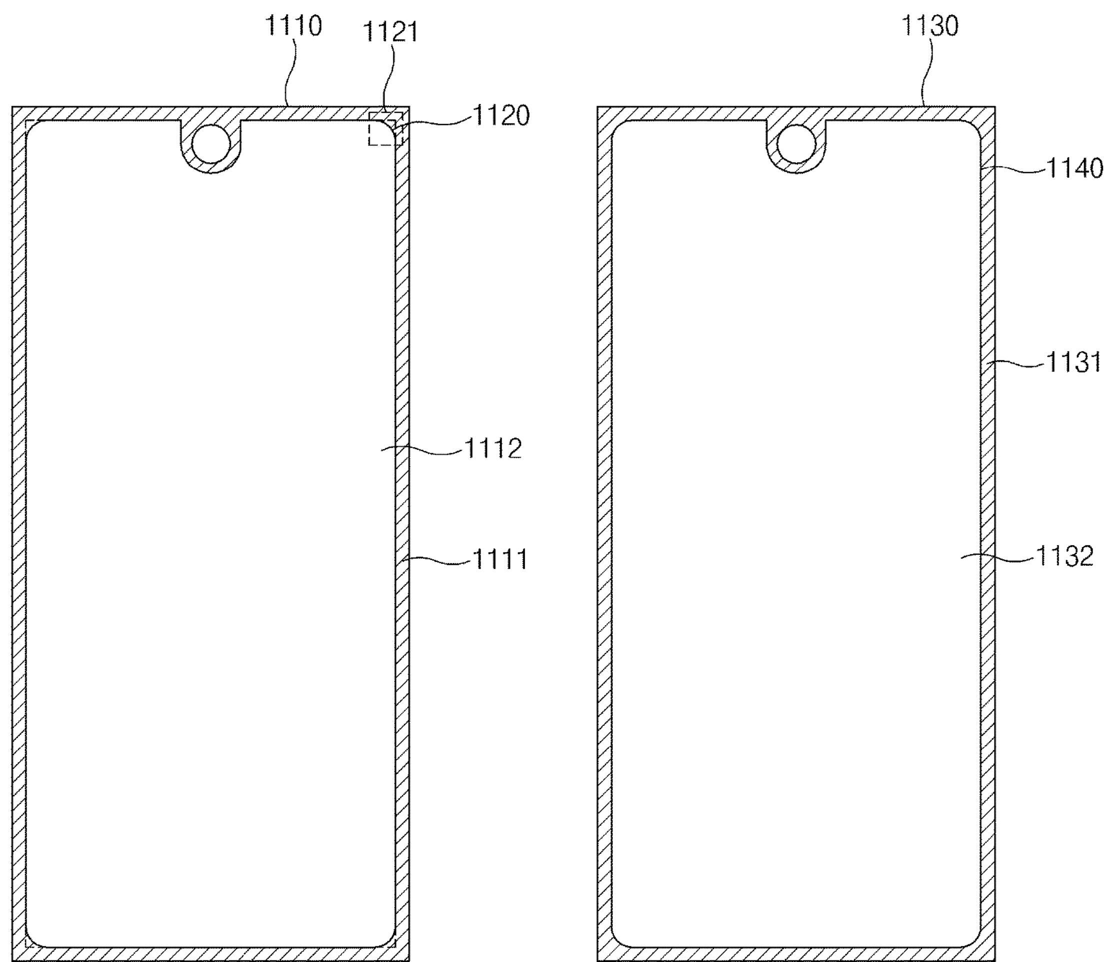
FIG. 11 illustrates a cover glass of an electronic device, according to an embodiment of the present disclosure.

FIG. 11 illustrates a cover glass of an electronic device, according to an embodiment of the present disclosure.

Referring to FIG. 11, a cover glass 1110 may include an opaque layer 1111 (e.g. a layer subject to black masking) printed on a surface of the cover glass 1110 to cover a vertex of an active area. The opaque layer 1111 may be printed in a circle on an area of the cover glass 1110 corresponding to a corner portion 1121 of the active area where the corner portion 1121 of the active area is curved.

According to an embodiment, the active area of a display panel 1140 may have curved corners. In this case, an opaque layer 1131 may be printed in a circle in the corner portion of the cover glass 1130 along the active area of the display panel.

Figure 12:
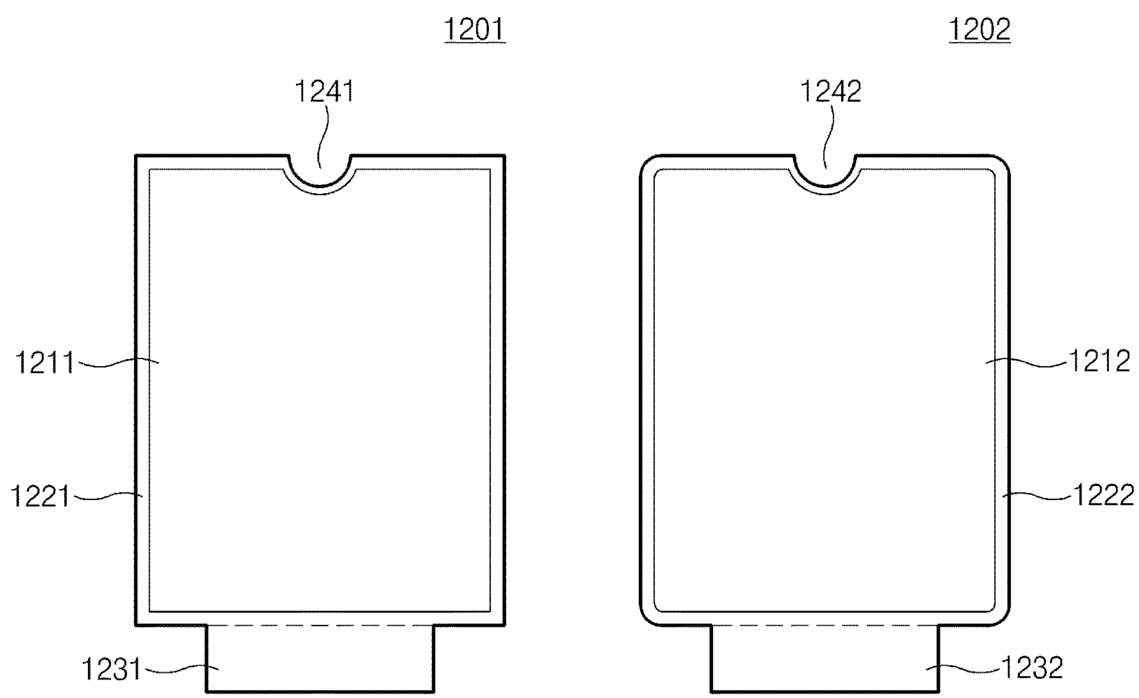
FIG. 12 illustrates a display panel of an electronic device, according to an embodiment of the present disclosure.

FIG. 12 illustrates a display panel of an electronic device, according to an embodiment of the present disclosure.

Referring to FIG. 12, a display panel 1201 may include an active area 1211, an inactive area 1221, and a PCB connection portion 1231. The display panel 1201 may include a cutaway portion 1241 formed in the center of the top end of the active area 1211. The cutaway portion 1241 may be formed by cutting away the display panel 1201 in a concave shape. A light emitting device may be disposed in the active area 1211. A display may be output to the active area 1211 based on the operation of the light emitting device. The active area 1211 may have a rectangular shape. The inactive area 1221 may be an area that surrounds the active area 1211. The PCB connection portion 1231 may be connected to an end of the inactive area 1221. For example, the PCB connection portion 1231 may be connected to a bottom end of the inactive area 1221. The PCB connection portion 1231 may connect lines extending from the active area 1211 with a PCB.

According to an embodiment, a display panel 1202 may include an active area 1212, an inactive area 1222, and a PCB connection portion 1232. The active area 1211 may have curved corners. In this case, the curved corners of the inactive area 1222 may be have the same curvature as the curved corners of the active area 1212.

According to various embodiments, the display panels 1201 and 1202 may be disposed inside the electronic device such that the active areas 1211 and 1212 are flat. Alternatively, the display panels 1201 and 1202 may be disposed inside the electronic device such that the active areas 1211 and 1212 have curved surfaces. The display panels 1201 and 1202 may be disposed inside the electronic device such that the top ends, bottom ends, left-side ends and/or right-side ends of the active areas 1211 and 1212 are curved.

Figure 13A:
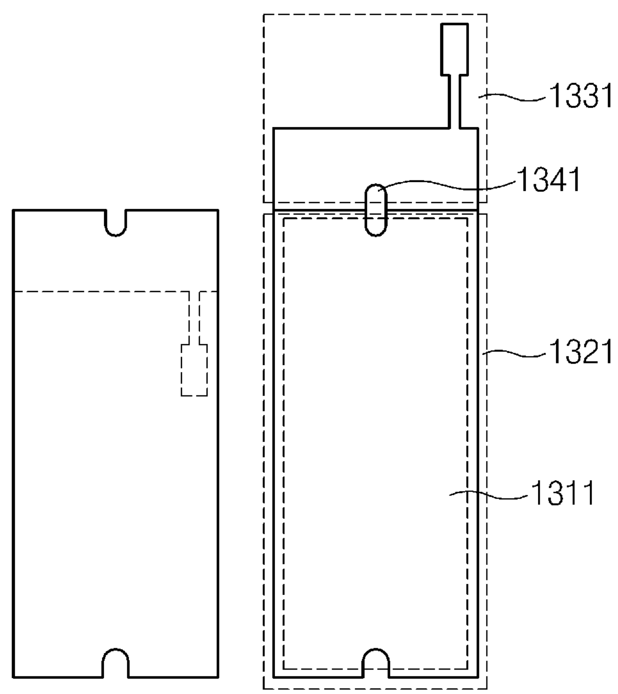
FIGS. 13A, 13B and 13C illustrate a display panel of an electronic device, according to an embodiment of the present disclosure.

FIGS. 13A. 13B and 13C illustrate display panels of electronic devices, according to an embodiment of the present disclosure.

Referring to FIG. 13A, a display panel 1301 may include an active area 1311, an inactive area 1321, and a PCB connection portion 1331. The display panel 1301 may include an opening 1341 formed in the center of a top end of the active area 1311. The opening 1341 may be formed in the active area 1311, the inactive area 1321, and the PCB connection portion 1331. When the display panel 1301 is folded about the opening 1341, the opening 1341 may have a U-shaped space when viewed from the front of the electronic device. In this case, a portion of the active area 1311 may overlap the PCB connection portion 1331. Various modules, such as a camera module and the like, may be disposed in the space formed by the opening 1341. A U-shaped cutaway portion may be formed in a bottom end of the display panel 1301. Although FIG. 13 illustrates that the cutaway portion is formed in the bottom end of the display panel 1301, the present disclosure is not limited thereto. For example, a cutaway portion may not be formed in the bottom end of the display panel 1301. The inactive area 1321 may surround the active area 1311. The PCB connection portion 1331 may be connected to one end of the inactive area 1321. For example, the PCB connection portion 1331 may be connected to a top end of the inactive area 1321. The PCB connection portion 1331 may connect lines extending from the active area 1311 with a PCB.

Figure 13B:
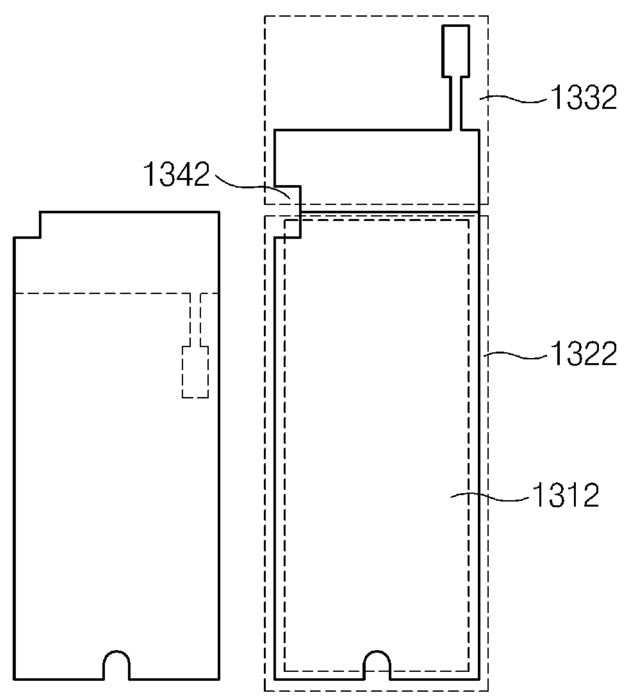

Referring to FIG. 13B, a display panel 1302 may include an active area 1312, an inactive area 1322, and a PCB connection portion 1332. The display panel 1302 may include a cutaway portion 1342 formed in a left top end of the active area 1312. When the display panel 1302 is folded about the cutaway portion 1342, the cutaway portion 1342 may form an L-shaped space when viewed from the front of an electronic device. In this case, a portion of the active area 1312 may overlap the PCB connection portion 1332. Various modules, such as a camera module and the like, may be disposed in the space formed by the cutaway portion 1342.

Figure 13C:
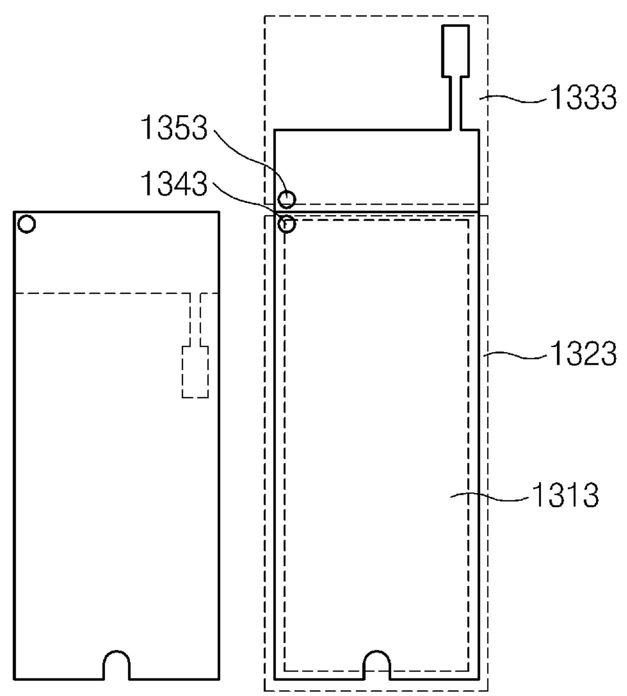

Referring to FIG. 13C, a display panel 1303 may include an active area 1313, an inactive area 1323, and a PCB connection portion 1333. The display panel 1303 may include a first opening 1343 formed in a left top end of the active area 1313 and a second opening 1353 formed in the PCB connection portion 1333. When the display panel 1303 is folded such that the first opening 1343 overlaps the second opening 1353, the first opening 1343 and the second opening 1353 may form an O-shaped space when viewed from the front of the electronic device. In this case, a portion of the active area 1313 may overlap the PCB connection portion 1333. Various modules, such as a camera module and the like, may be disposed in the space formed by the first opening 1343 and the second opening 1353.

Figure 14:
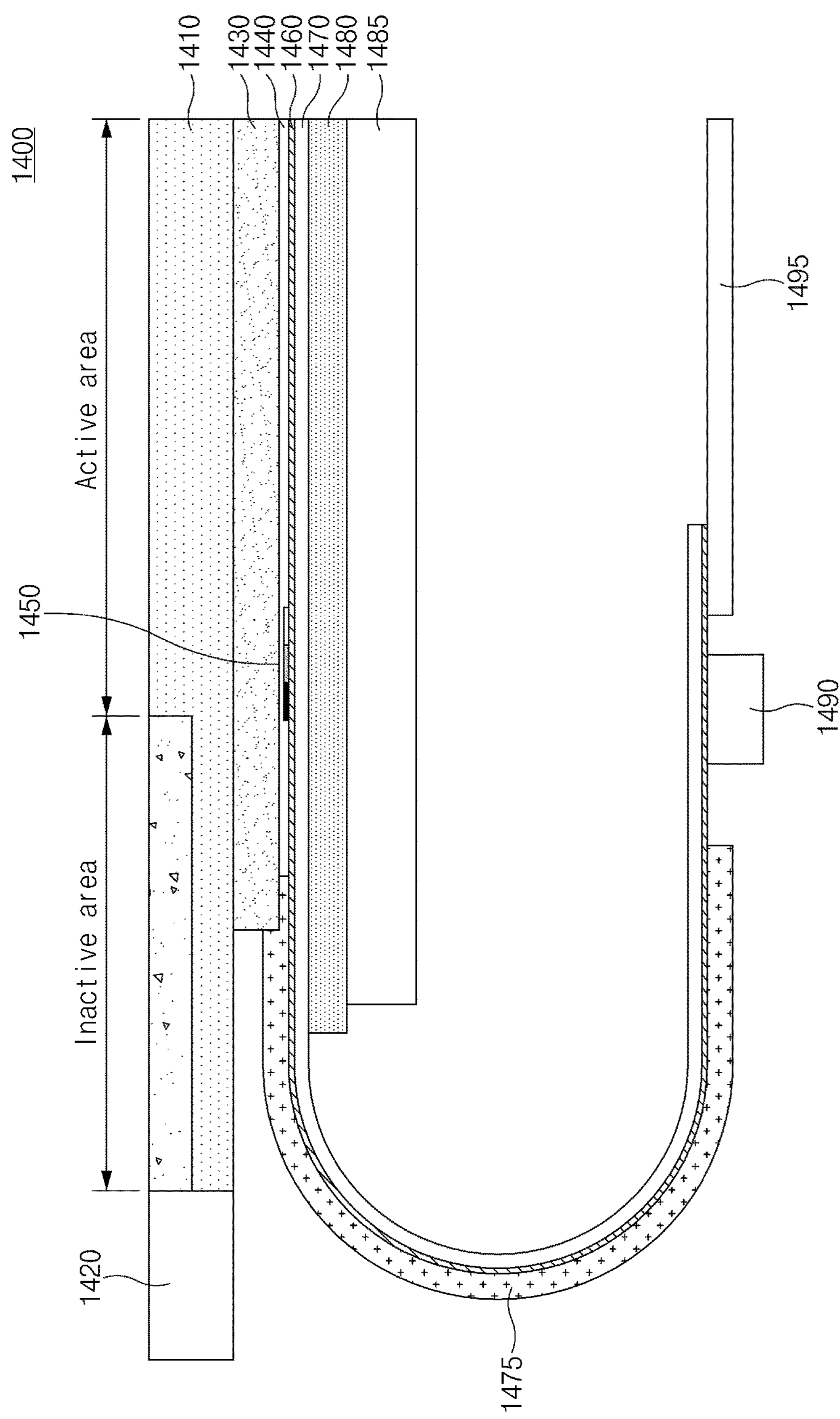
FIG. 14 is a sectional view illustrating an electronic device, according to an embodiment of the present disclosure.

FIG. 14 is a sectional view illustrating an electronic device, according to an embodiment of the present disclosure.

Referring to FIG. 14, an electronic device 1400 may include a cover glass 1410, a housing 1420, a polarizing plate 1430, an encapsulation layer 1440, a light emitting layer 1450, a thin film transistor (TFT) 1460, a substrate 1470, a buffer member 1475, a copper (Cu)/Graphite layer 1480, a cushion layer 1485, a display driver IC 1490, and a flexible printed circuit board (FPCB) 1495.

The polarizing plate 1430 may be disposed under the cover glass 1410. The polarizing plate 1430 may polarize light emitted from the light emitting layer 1450 to produce a desired color.

The encapsulation layer 1440 may prevent moisture from infiltrating into the light emitting layer 1450. The encapsulation layer 1440 may surround the light emitting layer 1450. The encapsulation layer 1440 may include an inorganic substance and an organic substance, and may be formed in the form of a thin film.

The light emitting layer 1450 may emit light. The light emitting layer 1450 may include various types of light emitting devices.

The TFT 1460 may transfer an electrical signal to the light emitting layer 1450 such that light is emitted from the light emitting layer 1450.

The substrate 1470 may support the TFT 1460, the light emitting layer 1450, the encapsulation layer 1440, and the polarizing plate 1430. For example, the substrate 1470 may include polyamide.

The buffer member 1475 may be disposed outside the curved portions of the TFT 1460 and the substrate 1470. The buffer member 1475 may reduce pressure that may be applied to the substrate 1470 when the substrate 1470 is bent. For example, the buffer member 1475 may be a stress neutralization layer (SNL).

The Cu/Graphite layer 1480 may be disposed under the substrate 1470. The Cu/Graphite layer 1480 may block noise from the TFT 1460 and may assist with the discharge of heat.

The cushion layer 1485 may be disposed under the Cu/Graphite layer 1480. The cushion layer 1485 may reduce pressure applied from the housing 1420.

The display driver IC 1490 may drive a display module. For example, the display driver IC 1490 may drive or control the TFT 1460.

The FPCB 1495 may connect a display with a main PCB of the electronic device 1400. The FPCB 1495 may be omitted in the structure of the present disclosure. In this case, the display and the main PCB of the electronic device 1400 may be directly connected with each other through a connector.

Figure 15:
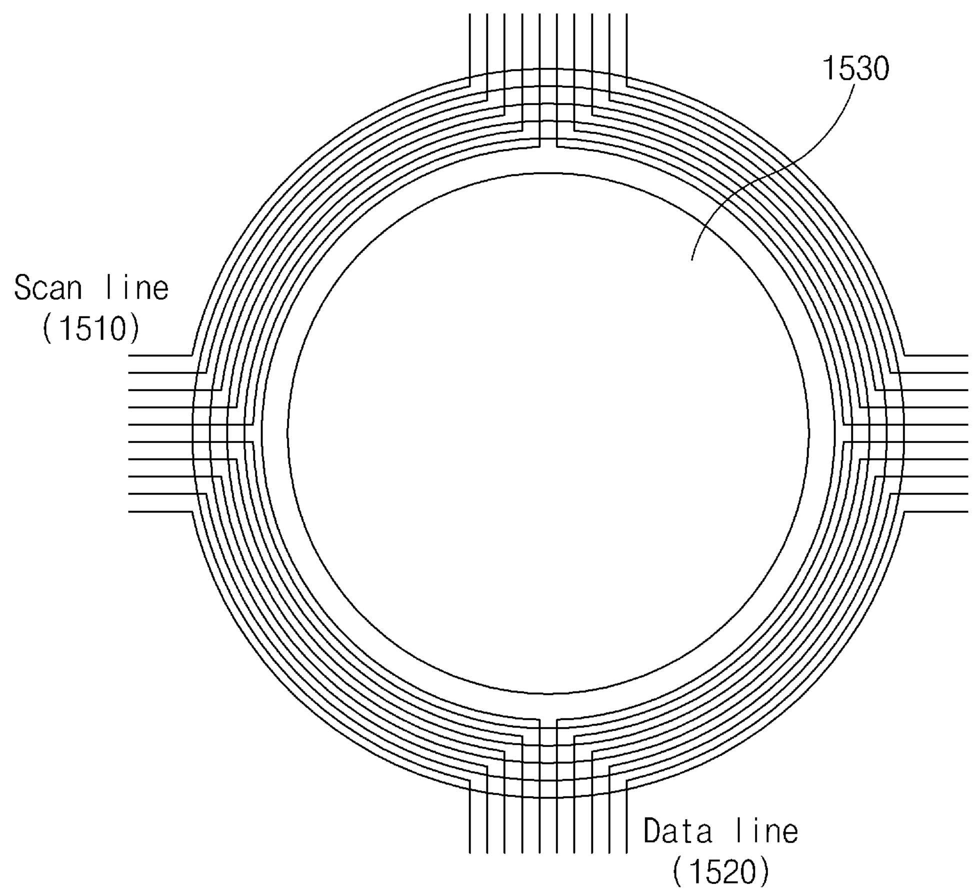
FIG. 15 illustrates a wiring structure in a peripheral portion of an opening formed in a display panel of an electronic device, according to an embodiment of the present disclosure.

FIG. 15 illustrates a wiring structure in a peripheral portion of an opening formed in a display panel of an electronic device, according to an embodiment of the present disclosure.

Referring to FIG. 15, a display panel may include scan lines 1510 and data lines 1520. Typically, the scan lines 1510 may extend along a width of the display panel, and the data lines 1520 may extend along a length of the display panel. When an opening 1530 is formed in the display panel, the paths of the scan lines 1510 and the data lines 1520 may be changed. When the scan lines 1510 meet the opening 1530, the scan lines 1510 may be curved along a perimeter of the opening 1530. After the scan lines 1510 curve around the perimeter of the opening 1530, the scan lines 1510 may extend along the width of the display panel. When the data lines 1520 meet the opening 1530, the data lines 1520 may be curved along the perimeter of the opening 1530. After the data lines 1520 curve around the perimeter of the opening 1530, the data lines 1520 may extend along the length of the display panel.

Figure 16:
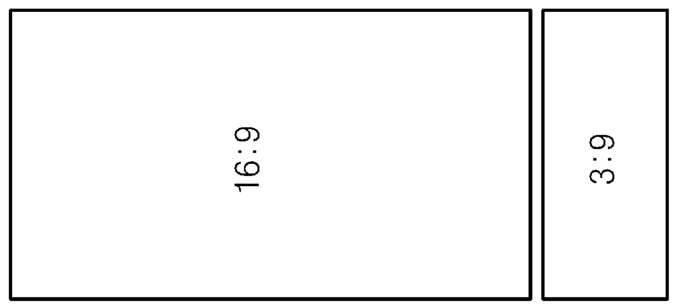
FIG. 16 illustrates an aspect ratio of a screen output through a display panel of an electronic device, according to an embodiment of the present disclosure.
Figure 16:
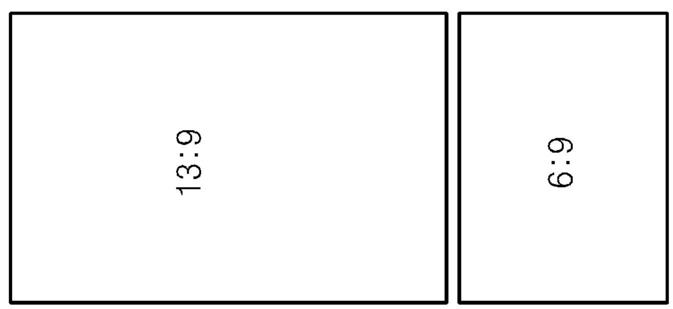
Figure 16:
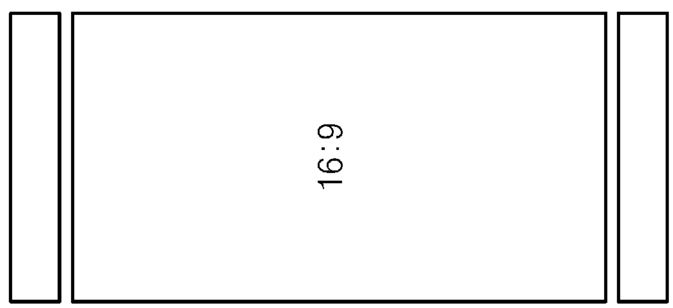
Figure 16:
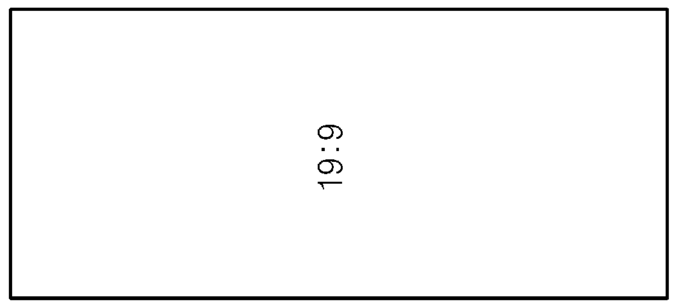

FIG. 16 illustrates an aspect ratio of a screen output through a display panel of an electronic device, according to an embodiment of the present disclosure.

Referring to FIG. 16, the aspect ratio of a display screen output through a display panel may be 19:9. According to an embodiment, the aspect ratio of the display screen may have a relatively higher value in a vertical direction when compared to the aspect ratio of 16:9 of a typical display screen. The display panel may output an image having the aspect ratio of 19:9.

According to an embodiment, the display panel may be divided into three different areas to display images. For example, the display panel may display images having an aspect ratio of 1.5:9 through a top end area and a bottom end area of the display panel. The display panel may display an image having an aspect ratio of 16:9 through a central area of the display panel. The aspect ratios of the top end area and the bottom end area may be varied. The top end area may display a status bar that provides a communication status, a remaining amount of a battery, a current time and/or a notification icon. For example, the bottom end area may display a soft key that executes functions such as "Menu call" and/or "cancel". The central area may display an image having the aspect ratio of 16:9. When an image (i.e. a high-definition (HD) image) having an aspect ratio of 16:9 is produced, the display panel may display the image on the central area while displaying the status bar in the top end area, and a soft key associated with the image in the bottom end area. A relatively greater portion of the content displayed on the display panel have an aspect ratio of 16:9. Accordingly, when general content is output through the above screen configuration, a convenient user interface may be provided.

According to an embodiment, the display panel may be divided into two different areas and may output an image to each of the two areas. In this case, for example, the display panel may output an image having an aspect ratio of 13:9 to an upper area of the display panel, and may output an image having the aspect ratio of 6:9 to a lower area of the display panel. Alternatively, the display panel may output an image having an aspect ratio of 16:9 to the upper area of the display panel, and may output an image having an aspect ratio of 3:9 to the lower area of the display panel. According to various embodiments, the aspect ratio of the upper area and the aspect ratio of the lower area may be varied. The display panel may output an execution screen of a first application to the upper area and may output an execution screen of a second application to the lower area. According to various embodiments, the display panel may be divided into at least two different display areas, for example, into three or four different display areas.

Figure 17:
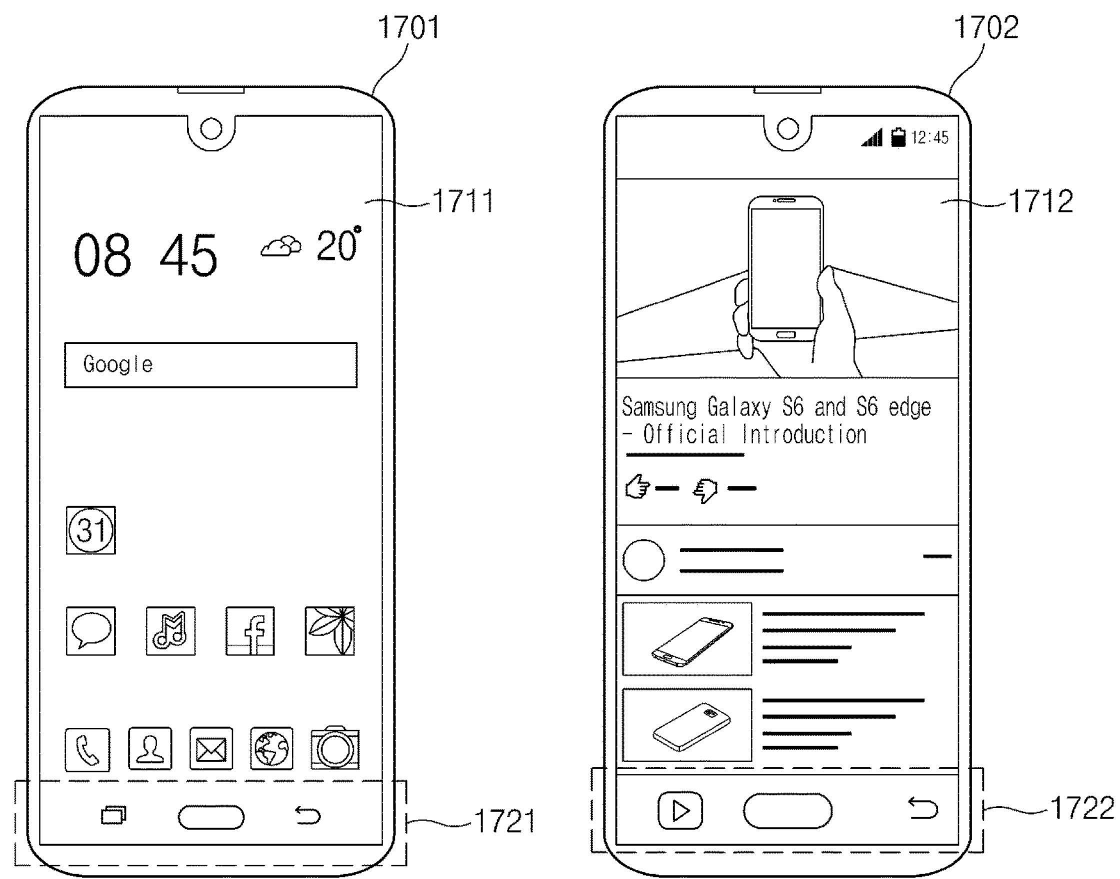
FIG. 17 illustrates an example of a screen output on a display panel of an electronic device, according to an embodiment of the present disclosure.

FIG. 17 illustrates an example of a screen output on a display panel of an electronic device, according to an embodiment of the present disclosure.

The electronic device may display a soft key associated with an application under execution on a bottom end of the display panel.

Referring to FIG. 17, an electronic device 1701 may display, for example, a home screen on a display panel 1711. A user may execute functions associated with changing the status of the electronic device 1701 or the settings of the electronic device 1701. When the home screen is displayed on the display panel 1711, the electronic device 1701 may display a menu key that can be used to call a menu for changing the status or the settings of the electronic device on a bottom end 1721 of the display panel 1711 together with a cancel key. The electronic device 1701 may provide a soft key that can be used to execute the function of the home button at the center of the bottom end of the display panel 1711.

Alternatively, an electronic device 1702 may execute an application for searching for and reproducing an image. When the application is executed, the electronic device 1702 may display the execution screen of the application on the display panel 1712. While the application is being executed, the user may, for example, execute functions, such as "play", "pause", "stop", "rewind" and "fast forward", for a video. When the execution screen of the application is displayed on the display panel 1712, the electronic device 1702 may display a key that can be, used to input a reproduction command on the bottom end 1722 of the display panel 1712 together with the cancel key.

Figure 18:
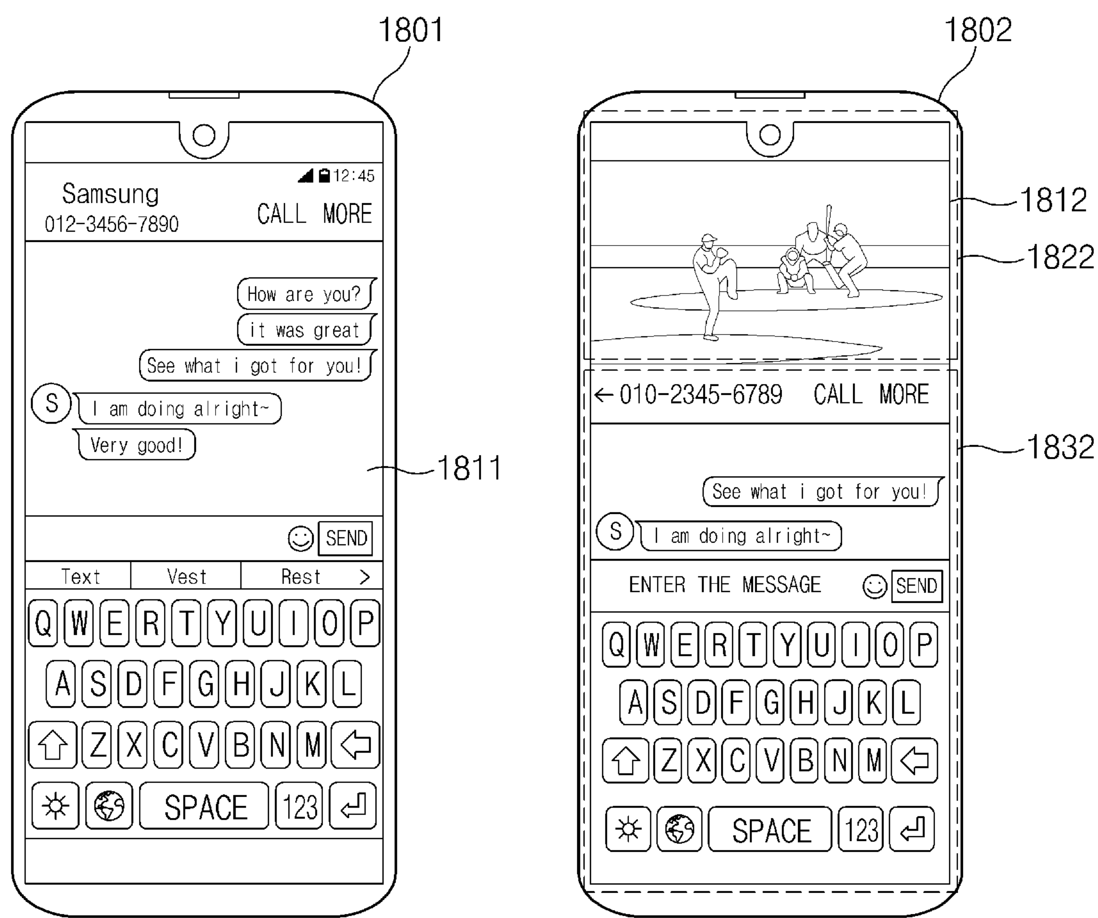
FIG. 18 illustrates an example of a screen output on a display panel of an electronic device, according to an embodiment of the present disclosure.

FIG. 18 illustrates an example of a screen display on a display panel of an electronic device, according to an embodiment of the present disclosure.

Referring to FIG. 18, an electronic device 1801 may display, for example, an execution screen of an application (e.g. an execution screen of a messenger application) on the entire portion of a display panel 1811. The electronic device 1801 may display a message on an upper portion of the display panel 1811 and may display a soft keyboard on a lower portion of the display panel 1811. The aspect ratio of the display screen may be, for example, 19:9.

Alternatively, the electronic device 1802 may display an execution screen of a first application (e.g. a video reproduction application) on a first area 1822 of the display panel 1812, and may display an execution screen of a second application (e.g. a messenger application) on a second area 1831 of the display panel 1812. The first area 1822 may be, for example, an upper portion of the display panel 1812, and the second area 1832 may be, for example, a lower portion of the display panel 1812. In this case, for example, the aspect ratio of the first area 1822 may be 3:9, and the aspect ratio of the second area 1832 may be 16:9. The aspect ratios of the first area 1822 and the second area 1832 may be set to specific values. For example, the aspect ratio of the first area may be set to 13:9, and the aspect ratio of the second area may be set to 6:9.

In addition, although FIG. 18 illustrates that the display panel 1812 is divided into two areas 1822, 1832, the present disclosure is not limited thereto. For example, the display panel 1812 may output a display screen to a display panel 1812 that is divided into at least three areas.

Figure 19:
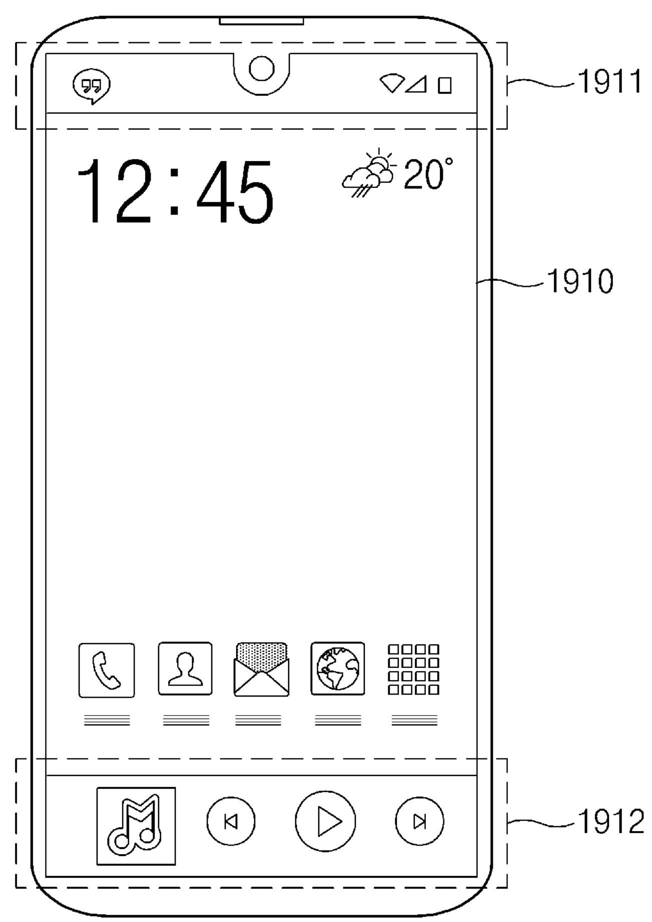
FIG. 19 illustrates an example of a screen output on a display panel of an electronic device, according to an embodiment of the present disclosure.

FIG. 19 illustrates an example of a screen output on a display panel of an electronic device, according to an embodiment of the present disclosure.

Referring to FIG. 19, an electronic device 1900 may display a home screen on a display panel 1910. The electronic device 1900 may display a status bar on a top end area 1911 of the display panel 1910. The electronic device 1900 may display a notification icon on the status bar. For example, the electronic device 1900 may display an icon associated with a text message on the status bar when a text message is received. If a touch input is applied to an icon displayed on the status bar, the electronic device 1900 may execute an application corresponding to the icon.

The electronic device 1900 may display objects that execute various functions on a bottom end area 1912 of the display panel 1910. For example, the electronic device 1900 may display a control panel that is used for controlling an application under execution in the electronic device 1900 on a bottom end area 1912 of the display panel 1910. For example, when a music playback application is executed in the electronic device 1900, the electronic device 1900 may display a control panel that is used for executing functions such as "play", "fast forward" and "rewind" on the bottom end area of the display panel 1910.

Figure 20:
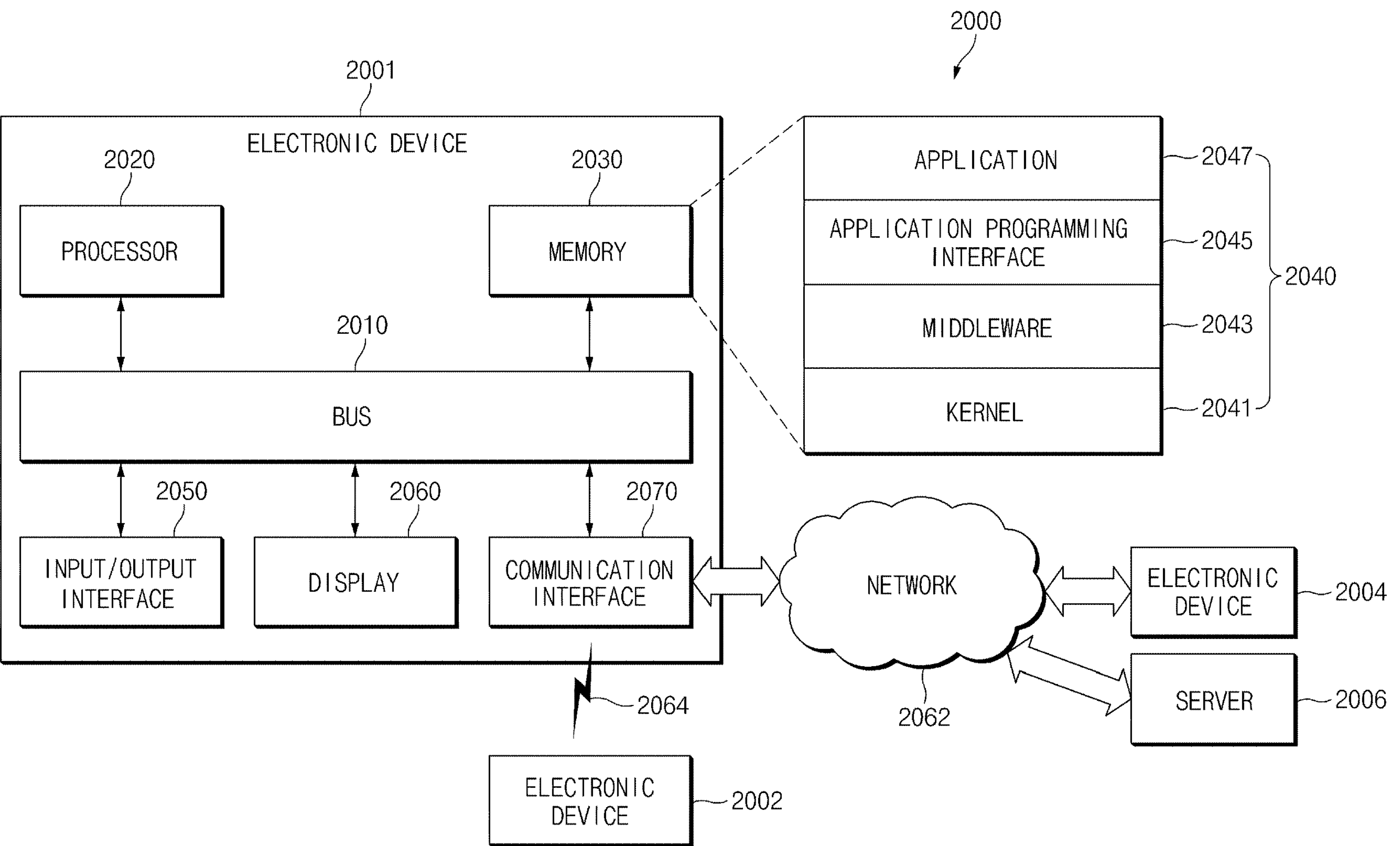
FIG. 20 illustrates an electronic device in a network environment, according to an embodiment of the present disclosure.

FIG. 20 illustrates an electronic device in a network environment, according to various embodiments.

Referring to FIG. 20, an electronic device 2001, 2002, 2004 or a server 2006 may be connected with each other via a network 2062 or via short range communication 2064. The electronic device 2001 may include a bus 2010, a processor 2020, a memory 2030, an input/output interface 2050, a display 2060, and a communication interface 2070. The electronic device 2001 may include a subset of the above-described elements or may further include additional element(s).

For example, the bus 2010 may interconnect the above-described elements 2010 to 2070 and may include a circuit for conveying communications (e.g. a control message and/or data) among the above-described elements.

The processor 2020 may include one or more of a central processing unit (CPU), an application processor (AP), or a communication processor (CP). For example, the processor 2020 may perform an arithmetic operation or data processing associated with control and/or communication of at least other elements of the electronic device 2001.

The memory 2030 may include a volatile and/or nonvolatile memory. For example, the memory 2030 may store instructions or data associated with at least one other element(s) of the electronic device 2001. The memory 2030 may store software and/or a program 2040. The program 2040 may include, for example, a kernel 2041, a middleware 2043, an application programming interface (API) 2045, and/or an application program (or an application) 2047. At least a part of the kernel 2041, the middleware 2043, or the API 2045 may be an operating system (OS).

For example, the kernel 2041 may control or manage system resources (e.g. the bus 2010, the processor 2020, the memory 2030, and the like) that are used to execute operations or functions of other programs (e.g. the middleware 2043, the API 2045, and the application 2047). Furthermore, the kernel 2041 may provide an interface that allows the middleware 2043, the API 2045, or the application 2047 to access discrete elements of the electronic device 2001 so as to control or manage system resources.

The middleware 2043 may perform a mediation role such that the API 2045 or the application 2047 communicates with the kernel 2041 to exchange data.

Furthermore, the middleware 2043 may process task requests received from the application 2047 according to a priority. For example, the middleware 2043 may assign a priority that makes it possible to use a system resource (e.g. the bus 2010, the processor 2020, the memory 2030, or the like) of the electronic device 2001 for at least one application 2047. For example, the middleware 2043 may process the one or more task requests according to assigned priorities which makes it possible to perform scheduling or load balancing on the one or more task requests.

The API 2045 may be, for example, an interface through which the application 2047 controls a function provided by the kernel 2041 or the middleware 2043, and may include, for example, at least one interface or function (e.g. an instruction) for a file control, a window control, image processing, a character control, or the like.

The input/output interface 2050 may, for example, operate as an interface which transmits an instruction or data input from a user or another external device to other element(s) of the electronic device 2001. Furthermore, the input/output interface 2050 may output an instruction or data received from other element(s) of the electronic device 2001 to a user or another external device.

The display 2060 may include, for example, a liquid crystal display (LCD), a light-emitting diode (LED) display, an organic LED (OLED) display, a microelectromechanical systems (MEMS) display, or an electronic paper display. The display 2060 may display, for example, various content (e.g. a text, an image, a video, an icon, a symbol, and the like) to a user. The display 2060 may include a touch screen and may receive, for example, a touch, gesture, proximity, or hovering input using an electronic pen or a part of a user's body.

The communication interface 2070 may, for example, establish communication between the electronic device 2001 and an external device (e.g. the first external electronic device 2002, the second external electronic device 2004, or the server 2006). For example, the communication interface 2070 may be connected to the network 2062 over wireless communication or wired communication to communicate with the external device (e.g. the second external electronic device 2004 or the server 2006).

The wireless communication may include at least one of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like, as cellular communication protocol. Furthermore, the wireless communication may include, for example, short range communication 2064. Short range communication 2064 may include at least one of a wireless fidelity (Wi-Fi), a bluetooth, a near field communication (NFC), a magnetic stripe transmission (MST), a global navigation satellite system (GNSS), or the like.

The MST may generate a pulse in response to transmission of data using an electromagnetic signal, and the pulse may generate a magnetic field signal. The electronic device 2001 may transfer the magnetic field signal to a POS device, and the POS device may detect the magnetic field signal using an MST reader. The POS device may recover the data by converting the detected magnetic field signal into an electrical signal.

The GNSS may include at least one of, for example, a global positioning system (GPS), a global navigation satellite system (Glonass), a Beidou navigation satellite system (Beidou), or an European global satellite-based navigation system (Galileo) based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 2062 may include at least one of telecommunications networks, for example, a computer network (e.g. LAN or WAN), an Internet based network, or a telephone network.

Each of the first and second external electronic devices 2002, 2004 may be different from or the same as the electronic device 2001. The server 2006 may include a group of one or more servers. All or a portion of the operations that the electronic device 2001 performs may be executed by another electronic device or a plurality of electronic devices (e.g. the electronic devices 2002, 2004 or the server 2006). When the electronic device 2001 executes a function or a service automatically or in response to a request, the electronic device 2001 may not perform the function or the service internally, but may request at least a portion of a function associated with the electronic device 2001 be performed at another device. The other electronic device may execute the requested function or additional functions and may transmit the execution result to the electronic device 2001. The electronic device 2001 may provide the requested function or service using the received result or may additionally process the received result to provide the requested function or service. To this end, for example, cloud computing, distributed computing, or client-server computing may be used.

Figure 21:
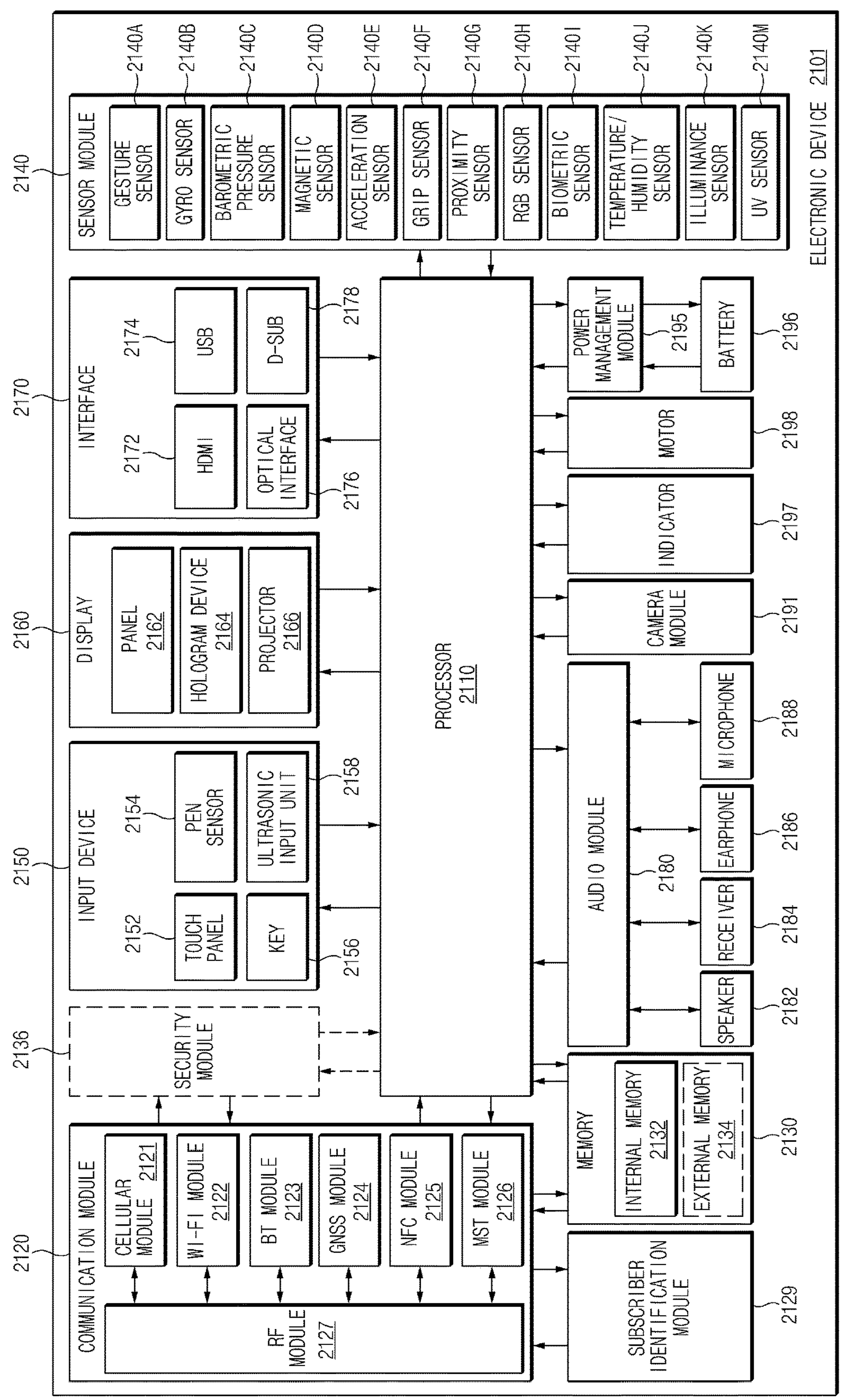
FIG. 21 illustrates a block diagram of an electronic device, according to an embodiment of the present disclosure.

FIG. 21 illustrates a block diagram of an electronic device according to various embodiments of the present disclosure.

Referring to FIG. 21, an electronic device 2101 may include, for example, all or a part of the electronic device 2001 illustrated in FIG. 20. The electronic device 2101 may include one or more processors (e.g. an application processor) 2110, a communication module 2120, a subscriber identification module (SIM) 2129, a memory 2130, a sensor module 2140, an input device 2150, a display 2160, an interface 2170, an audio module 2180, a camera module 2191, a power management module 2195, a battery 2196, an indicator 2197, and a motor 2198.

The processor 2110 may drive, for example, an OS or an application to control a plurality of hardware or software elements connected to the processor 2110 and may process and compute a variety of data. For example, the processor 2110 may be implemented with a system on chip (SoC). The processor 2110 may further include a graphic processing unit (GPU) and/or an image signal processor. The processor 2110 may include at least a part (e.g. a cellular module 2121) of the elements illustrated in FIG. 21. The processor 2110 may load and process an instruction or data which is received from at least one of the other elements (e.g. a nonvolatile memory) and may store a variety of data in a nonvolatile memory.

The communication module 2120 may be configured the same as or similar to the communication interface 2070 of FIG. 20. The communication module 2120 may include one or more of the cellular module 2121, a Wi-Fi module 2122, a bluetooth (BT) module 2123, a GNSS module 2124 (e.g. a GPS module, a Glonass module, a Beidou module, or a Galileo module), an NFC module 2125, an MST module 2126, and a radio frequency (RF) module 2127.

The cellular module 2121 may provide, for example, voice communication, video communication, a character service, an Internet service, or the like over a communication network. The cellular module 2121 may perform discrimination and authentication of the electronic device 2101 within a communication network by using the SIM (e.g. a SIM card) 2129. The cellular module 2121 may perform at least a portion of the functions that the processor 2110 provides. The cellular module 2121 may include a communication processor (CP).

Each of the Wi-Fi module 2122, the BT module 2123, the GNSS module 2124, the NFC module 2125, and the MST module 2126 may include a processor for processing data exchanged through a corresponding module. At least a part (e.g. two or more) of the cellular module 2121, the Wi-Fi module 2122, the BT module 2123, the GNSS module 2124, the NFC module 2125, and the MST module 2126 may be included within one integrated circuit (IC) or an IC package.

For example, the RF module 2127 may transmit and receive a communication signal (e.g. an RF signal). For example, the RF module 2127 may include a transceiver, a power amplifier module (PAM), a frequency filter, a low noise amplifier (LNA), an antenna, or the like. At least one of the cellular module 2121, the Wi-Fi module 2122, the BT module 2123, the GNSS module 2124, the NFC module 2125, and the MST module 2126 may transmit and receive an RF signal through a separate RF module.

The SIM 2129 may include, for example, a card and/or embedded SIM that includes a subscriber identification module and may include unique identify information (e.g. integrated circuit card identifier (ICCID) or subscriber information (e.g. integrated mobile subscriber identity (IMSI)).

The memory 2130 (e.g. the memory 2030) may include an internal memory 2132 or an external memory 2134. For example, the internal memory 2132 may include at least one of a volatile memory (e.g. a dynamic random access memory (DRAM), a static RAM (SRAM), and a synchronous DRAM (SDRAM)), a nonvolatile memory (e.g. a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g. a NAND flash memory or a NOR flash memory)), a hard drive, and a solid state drive (SSD).

The external memory 2134 may further include a flash drive such as a compact flash (CF), a secure digital (SD), a micro secure digital (Micro-SD), a mini secure digital (Mini-SD), an extreme digital (xD), a multimedia card (MMC), a memory stick, or the like. The external memory 2134 may be operatively and/or physically connected to the electronic device 2101 through various interfaces.

A security module 2136 may be a module that includes a storage space having a security level is relatively higher than that of the memory 2130 and may be a circuit that guarantees safe data storage and a protected execution environment. The security module 2136 may be implemented with a separate circuit and may include a separate processor. For example, the security module 2136 may be in a smart chip or a secure digital (SD) card, which is removable, or may include an embedded secure element (eSE) embedded in a fixed chip of the electronic device 2101. Furthermore, the security module 2136 may operate based on an OS that is different from the OS of the electronic device 2101. For example, the security module 2136 may operate based on java card open platform (JCOP) OS.

The sensor module 2140 may measure, for example, a physical quantity or may detect an operation state of the electronic device 2101. The sensor module 2140 may convert the measured or detected information to an electric signal. Generally or additionally, the sensor module 2140 may include at least one of a gesture sensor 2140A, a gyro sensor 2140B, a barometric pressure sensor 2140C, a magnetic sensor 2140D, an acceleration sensor 2140E, a grip sensor 2140F, a proximity sensor 2140G, a color sensor 2140H (e.g. red, green, blue (RGB) sensor), a biometric sensor 2140I, a temperature/humidity sensor 2140J, an illuminance sensor 2140K, and a UV sensor 2140M. The sensor module 2140 may further include, for example, an E-nose sensor, an electromyography sensor (EMG) sensor, an electroencephalogram (EEG) sensor, an electrocardiogram (ECG) sensor, an infrared (IR) sensor, an iris sensor, a fingerprint sensor, and the like. The sensor module 2140 may further include a control circuit for controlling at least one or more sensors included therein. The electronic device 2101 may further include a processor that is a part of the processor 2110 or independent of the processor 2110 and is configured to control the sensor module 2140. The processor may control the sensor module 2140 while the processor 2110 remains at a sleep state.

The input device 2150 may include, for example, a touch panel 2152, a (digital) pen sensor 2154, a key 2156, or an ultrasonic input unit 2158. For example, the touch panel 2152 may use at least one of capacitive, resistive, infrared and ultrasonic detecting methods. Also, the touch panel 2152 may further include a control circuit. The touch panel 2152 may further include a tactile layer to provide a tactile reaction to a user.

The (digital) pen sensor 2154 may be, for example, a part of a touch panel or may include an additional sheet for recognition. The key 2156 may include, for example, a physical button, an optical key, a keypad, or the like. The ultrasonic input device 2158 may detect (or sense) an ultrasonic signal, which is generated from an input device, such as through a microphone 2188 and may check data corresponding to the detected ultrasonic signal.

The display 2160 (e.g. the display 2060) may include a panel 2162, a hologram device 2164, or a projector 2166. The panel 2162 may be the same as or similar to the display 2060 illustrated in FIG. 20. The panel 2162 may be implemented, for example, to be flexible, transparent or wearable. The panel 2162 and the touch panel 2152 may be integrated into a single module. The hologram device 2164 may display a stereoscopic image in a space using a light interference phenomenon. The projector 2166 may project light onto a screen so as to display an image. The screen may be disposed inside or outside of the electronic device 2101. The display 2160 may further include a control circuit for controlling the panel 2162, the hologram device 2164, or the projector 2166.

The interface 2170 may include, for example, an HDMI 2172, a USB 2174, an optical interface 2176, or a D-subminiature (D-sub) 2178. The interface 2170 may be included, for example, in the communication interface 2070 illustrated in FIG. 20. The interface 2170 may include, for example, a mobile high definition link (MHL) interface, a SD card/multi-media card (MMC) interface, or an infrared data association (IrDA) standard interface.

The audio module 2180 may convert a sound and an electric signal in dual directions. At least a part of the audio module 2180 may be included, for example, in the input/output interface 2050 illustrated in FIG. 20. The audio module 2180 may process, for example, sound information that is input or output through a speaker 2182, a receiver 2184, an earphone 2186, or the microphone 2188.

The camera module 2191 for shooting a still image or a video may include, for example, at least one or more image sensors (e.g. a front sensor or a rear sensor), a lens, an image signal processor (ISP), and a flash (e.g. an LED or a xenon lamp).

The power management module 2195 may manage, for example, power of the electronic device 2101. A power management integrated circuit (PMIC), a charger IC, or a battery gauge may be included in the power management module 2195. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 2196, a voltage, a current or a temperature while the battery is charged. The battery 2196 may include, for example, a rechargeable battery and/or a solar battery.

The indicator 2197 may display a specific state of the electronic device 2101 or a part thereof (e.g. the processor 2110), such as a booting state, a message state, a charging state, and the like. The motor 2198 may convert an electrical signal into a mechanical vibration and may generate the following effects: vibration, haptic, and the like. A processing device (e.g. a GPU) for supporting a mobile TV may be included in the electronic device 2101. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. The electronic device may include at least one of the above-mentioned elements, and some elements may be omitted or other additional elements may be added. Furthermore, some of the elements of the electronic device may be combined with each other so as to form a single entity, so that the functions of the elements may be performed in the same manner as before the combination.

Figure 22:
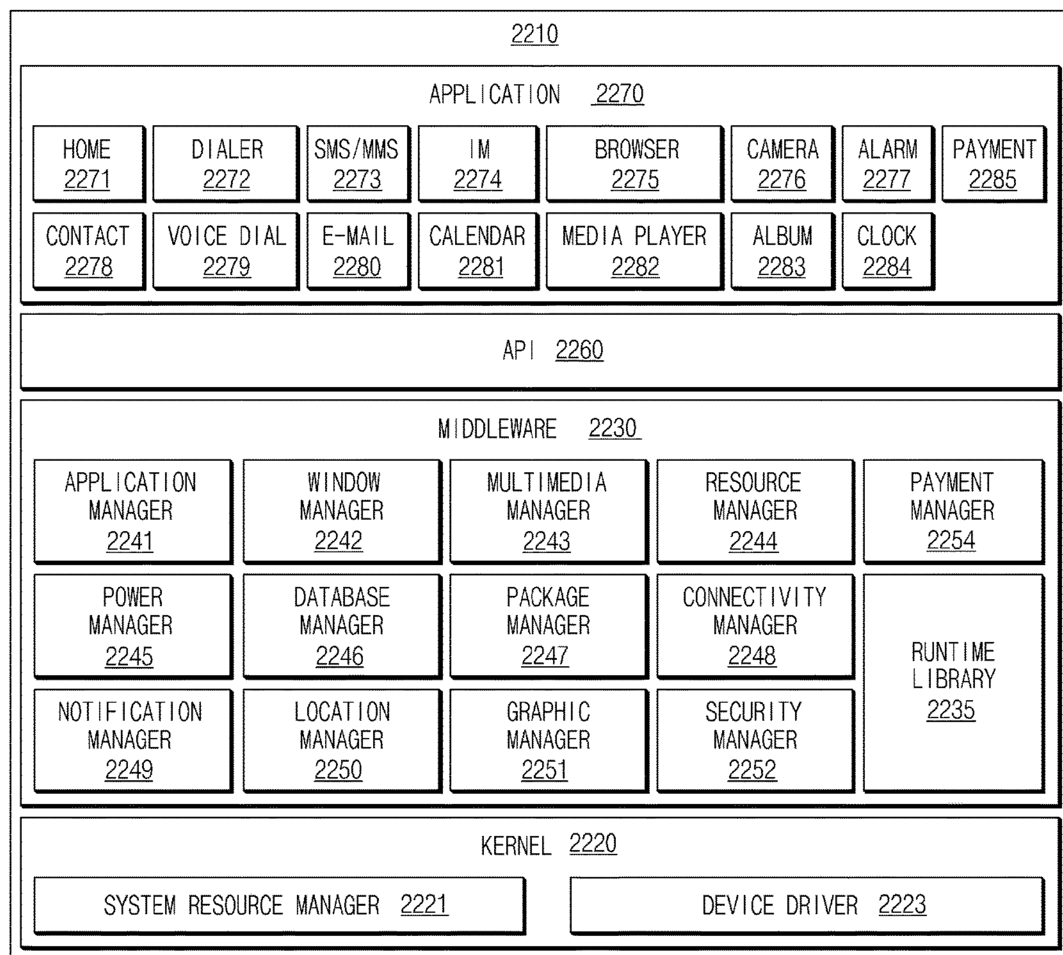
FIG. 22 illustrates a block diagram of a program module, according to an embodiment of the present disclosure.

FIG. 22 illustrates a block diagram of a program module, according to various embodiments of the present disclosure.

A program module 2210 (e.g. the program 2040) may include an OS to control resources associated with an electronic device 2001, and/or diverse applications (e.g. the application program 2047) driven on the OS. The OS may be, for example, Android, iOS, Windows, Symbian, Tizen, or Samsung Bada OS.

The program module 2210 may include a kernel 2220, a middleware 2230, an application programming interface (API) 2260, and/or an application 2270. At least a portion of the program module 2210 may be preloaded on an electronic device or may be downloadable from an external electronic device (e.g. the electronic device 2002 or 2004, the server 2006, and the like).

The kernel 2220 (e.g. the kernel 2041) may include, for example, a system resource manager 2221 or a device driver 2223. The system resource manager 2221 may perform control, allocation, or retrieval of system resources. The system resource manager 2221 may include a process managing unit, a memory managing unit, or a file system managing unit. The device driver 2223 may include, for example, a display driver, a camera driver, a bluetooth driver, a shared memory driver, a USB driver, a keypad driver, a Wi-Fi driver, an audio driver, or an inter-process communication (IPC) driver.

The middleware 2230 may provide, for example, a function that the application 2270 needs in common, or may provide diverse functions to the application 2270 through the API 2260 to allow the application 2270 to efficiently use limited system resources of the electronic device. The middleware 2230 (e.g. the middleware 2043) may include at least one of a runtime library 2235, an application manager 2241, a window manager 2242, a multimedia manager 2243, a resource manager 2244, a power manager 2245, a database manager 2246, a package manager 2247, a connectivity manager 2248, a notification manager 2249, a location manager 2250, a graphic manager 2251, a security manager 2252, and a payment manager 2254.

The runtime library 2235 may include, for example, a library module that is used by a compiler to add a new function through a programming language while the application 2270 is being executed. The runtime library 2235 may perform input/output management, memory management, or capacities about arithmetic functions.

The application manager 2241 may manage, for example, a life cycle of at least one application of the application 2270. The window manager 2242 may manage a GUI resource that is used in a screen. The multimedia manager 2243 may identify a format necessary for playing diverse media files, and may perform encoding or decoding of media files by using a codec suitable for the format. The resource manager 2244 may manage resources such as a storage space, memory, or source code of at least one application of the application 2270.

The power manager 2245 may operate, for example, with a basic input/output system (BIOS) to manage a battery or power, and may provide power information for an operation of an electronic device. The database manager 2246 may generate, search for, or modify a database that is to be used in at least one application of the application 2270. The package manager 2247 may install or update an application that is distributed in the form of package file.

The connectivity manager 2248 may manage, for example, wireless connections such as Wi-Fi or bluetooth. The notification manager 2249 may display or provide notification of an event such as arrival of a message, an appointment, or a proximity notification in a mode that does not disturb a user. The location manager 2250 may manage location information about an electronic device. The graphic manager 2251 may manage a graphic effect that is provided to a user, or manage a user interface relevant thereto. The security manager 2252 may provide a general security function necessary for system security or user authentication. When an electronic device 2001 includes a telephony function, the middleware 2230 may further include a telephony manager for managing a voice or video call function of the electronic device.

The middleware 2230 may include a middleware module that combines diverse functions of the above-described elements. The middleware 2230 may provide a module specialized to each kind of OS to provide differentiated functions. Additionally, the middleware 2230 may dynamically remove a part of pre-existing elements or may add new elements.

The API 2260 (e.g. the API 2045) may be, for example, a set of programming functions and may be provided with a configuration that is variable depending on an OS. For example, when the OS is Android or iOS, it may be permissible to provide one API set per platform. When the OS is Tizen, it may be permissible to provide two or more API sets per platform.

The application 2270 (e.g. the application 2047) may include, for example, one or more applications capable of providing functions for a home 2271, a dialer 2272, an SMS/MMS 2273, an instant message (IM) 2274, a browser 2275, a camera 2276, an alarm 2277, a contact 2278, a voice dial 2279, an e-mail 2280, a calendar 2281, a media player 2282, an album 2283, and a timepiece 2284, or for offering health care (e.g. measuring an exercise quantity, blood sugar, or the like) or environment information (e.g. atmospheric pressure, humidity, temperature, or the like).

The application 2270 may include an information exchanging application to support information exchange between an electronic device 2001 and an external electronic device 2002 or 2004. The information exchanging application may include, for example, a notification relay application for transmitting specific information to an external electronic device, or a device management application for managing the external electronic device.

For example, the notification relay application may include a function of transmitting notification information, which arise from other applications (e.g. applications for SMS/MMS, e-mail, health care, or environmental information), to an external electronic device 2002 or 2004. Additionally, the information exchanging application may receive, for example, notification information from an external electronic device and provide the notification information to a user.

The device management application may manage (e.g. install, delete, or update), for example, at least one function (e.g. turn-on/turn-off of an external electronic device itself (or a part of elements) or adjustment of brightness (or resolution) of a display) of the external electronic device which communicates with the electronic device, an application running in the external electronic device, or a service (e.g. a call service, a message service, or the like) provided from the external electronic device.

The application 2270 may include an application (e.g. a health care application of a mobile medical device) that is assigned in accordance with an attribute of an external electronic device. The application 2270 may include an application that is received from an external electronic device. The application 2270 may include a preloaded application or a third party application that is downloadable from a server. The element titles of the program module 2210 may be modifiable depending on the kind of operating system.

At least a portion of the program module 2210 may be implemented by software, firmware, hardware, or a combination of two or more thereof. At least a portion of the program module 2210 may be implemented (e.g. executed), for example, by the processor 2110. At least a portion of the program module 2210 may include, for example, modules, programs, routines, sets of instructions, processes, or the like for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing operations, that are known or may be developed.

At least a part of an apparatus (e.g. modules or functions thereof) or a method (e.g. operations) may be, for example, implemented by instructions stored in a computer-readable storage media in the form of a program module. The instructions, when executed by a processor 2020, may cause the one or more processors to perform a function corresponding to the instructions. The computer-readable storage media, for example, may be the memory 2030.

A computer-readable recording medium may include a hard disk, a floppy disk, a magnetic media (e.g. a magnetic tape), an optical media (e.g. a compact disc read only memory (CD-ROM) and a digital versatile disc (DVD), a magneto-optical media (e.g. a floptical disk)), and hardware devices (e.g. a read only memory (ROM), a random access memory (RAM), or a flash memory). Also, a program instruction may include not only mechanical code such as things generated by a compiler but also high-level language code executable on a computer using an interpreter. The above hardware unit may be configured to operate via one or more software modules for performing an operation of the present disclosure, and vice versa.

A module or a program module according to various embodiments may include at least one of the above elements, a subset of the above elements, or additional elements. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

As described above, according to embodiments of the present disclosure, after the opening or the cutaway portion is formed in the display panel, the display panel is folded such that the opening or the cutaway portion is positioned at a folded portion of the display panel, thereby reducing the areas of the opening or the cutaway portion exposed to the outside and ensuring the space in which the front-surface camera module is positioned.

In addition, various effects may be directly or indirectly produced through the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:

a housing including a first surface facing a first direction, a second surface facing a second direction opposite to the first direction, and a side surface extending between and along a perimeter of the first surface and the second surface;

a cover glass corresponding to at least the first surface;

a display panel disposed under the cover glass and including an active area exposed through the cover glass, an inactive area surrounding the active area, and a printed circuit board connection portion connected to one end of the inactive area, wherein an opening is formed in a top end of the active area, and the display panel is disposed inside the housing and folded such that the opening is positioned at the folded portion of the display panel; and a camera module disposed in a space formed by the opening and exposed through the cover glass.

2. The electronic device of claim 1, wherein at least a portion of the active area, at least a portion of the inactive area, and at least a portion of the camera module are exposed through the first surface.

3. The electronic device of claim 1, wherein at least a portion of the active area and at least a portion of the camera module are exposed through the first surface, and the inactive area is disposed under the side surface or the second surface.

4. The electronic device of claim 1, wherein the display panel covers at least a portion of the first surface and the side surface.

5. The electronic device of claim 1, wherein the display panel is disposed inside the housing and the display panel is curved to form curved surfaces at a left-side end, a right-side end, a top end, and a bottom end of the display panel.

6. The electronic device of claim 1, further comprising:

a receiver disposed inside the housing; and at least one receiver hole formed in a top end of the first surface, wherein a sound generated from the receiver passes through the at least one receiver hole.

7. The electronic device of claim 1, further comprising:

a receiver disposed inside the housing; and at least one receiver hole formed in the side surface, wherein a sound generated from the receiver passes through the at least one receiver hole.

8. The electronic device of claim 7, wherein the receiver includes a piezo-speaker.

9. The electronic device of claim 1, wherein the electronic device further comprises a button disposed in a space formed by another opening formed in a bottom end of the active area.

10. The electronic device of claim 1, further comprising:

a fingerprint sensor disposed under a lower portion of the display panel.

11. The electronic device of claim 10, wherein the cover glass includes a recessed part formed in a position corresponding to the fingerprint sensor.

12. The electronic device of claim 1, further comprising:

at least one sensor configured to perform a sensing operation through the opening.

13. The electronic device of claim 1, further comprising:

at least one sensor configured to perform a sensing operation through a hole formed in the side surface.

14. The electronic device of claim 13, wherein the at least one sensor includes a proximity sensor and an illuminance sensor.

15. The electronic device of claim 1, wherein the cover glass includes a layer printed on a surface of the cover glass to cover a vertex of the active area.

16. An electronic device comprising:

a housing including a first surface facing a first direction, a second surface facing a second direction opposite to the first direction, and a side surface extending between and along a perimeter of the first surface and the second surface;

a cover glass corresponding to at least the first surface;

a display panel including an active area exposed through the cover glass, an inactive area surrounding the active area, and a printed circuit board connection portion connected to one end of the inactive area, wherein a cutaway portion is formed in a corner of the active area, and the display panel is disposed inside the housing and folded such that the cutaway portion is positioned at the folded portion of the display panel; and a camera module disposed in a space formed by the cutaway portion and exposed through the cover glass.

17. An electronic device comprising:

a housing including a first surface facing a first direction, a second surface facing a second direction opposite to the first direction, and a side surface extending between and along a perimeter of the first surface and the second surface;

a cover glass corresponding to at least the first surface;

a display panel including an active area exposed through the cover glass, an inactive area surrounding the active area, and a printed circuit board connection portion connected to one end of the inactive area, wherein a first opening is formed in the active area, a second opening is formed in the inactive area or the printed circuit board connection portion, and the display panel is disposed inside the housing and folded so that the first opening overlaps the second opening; and a camera module inserted into the first opening and the second opening and exposed through the cover glass.

* * * * *